United States Patent
Rolfe et al.

(10) Patent No.: US 11,481,669 B2
(45) Date of Patent: Oct. 25, 2022

(54) SYSTEMS, METHODS AND APPARATUS FOR SAMPLING FROM A SAMPLING SERVER

(71) Applicant: D-WAVE SYSTEMS INC., Burnaby (CA)

(72) Inventors: Jason T. Rolfe, Vancouver (CA); William G. Macready, West Vancouver (CA); Mani Ranjbar, Port Coquitlam (CA); Mayssam Mohammad Nevisi, Coquitlam (CA)

(73) Assignee: D-WAVE SYSTEMS INC., Burnaby (CA)

( * ) Notice: Subject to any disclaimer, the term of this patent is extended or adjusted under 35 U.S.C. 154(b) by 753 days.

(21) Appl. No.: 16/336,625

(22) PCT Filed: Sep. 26, 2017

(86) PCT No.: PCT/US2017/053303
§ 371 (c)(1),
(2) Date: Mar. 26, 2019

(87) PCT Pub. No.: WO2018/058061
PCT Pub. Date: Mar. 29, 2018

(65) Prior Publication Data
US 2021/0289020 A1 Sep. 16, 2021

Related U.S. Application Data

(60) Provisional application No. 62/399,683, filed on Sep. 26, 2016.

(51) Int. Cl.
*G06N 20/00* (2019.01)
*G06N 10/00* (2022.01)
(Continued)

(52) U.S. Cl.
CPC ............... *G06N 20/00* (2019.01); *G06F 9/30* (2013.01); *G06F 15/173* (2013.01); *G06N 7/005* (2013.01);
(Continued)

(58) Field of Classification Search
CPC ......... H04L 67/10; G06F 15/173; G06F 9/30; G06N 7/08; G06N 7/005; G06N 3/0445; G06N 3/0472; G06N 20/00; G06N 10/00
See application file for complete search history.

(56) References Cited

U.S. PATENT DOCUMENTS 3,470,828 A 10/1969 Powell et al.
5,249,122 A 9/1993 Stritzke
(Continued)

FOREIGN PATENT DOCUMENTS

CA 2984773 A1 12/2016
CN 101473346 A 7/2009
(Continued)

OTHER PUBLICATIONS

Korean Office Action for Application 10-2019-7012141, dated Nov. 29, 2021, 18 pages (including English translation).
(Continued)

*Primary Examiner* — Arvin Eskandarnia
*Assistant Examiner* — Chhian (Amy) Ling
(74) *Attorney, Agent, or Firm* — Cozen O'Connor

(57) ABSTRACT

A digital processor runs a machine learning algorithm in parallel with a sampling server. The sampling sever may continuously or intermittently draw samples for the machine learning algorithm during execution of the machine learning algorithm, for example on a given problem. The sampling server may run in parallel (e.g., concurrently, overlapping, simultaneously) with a quantum processor to draw samples from the quantum processor.

18 Claims, 7 Drawing Sheets

(51) Int. Cl.

| | | |
|---|---|---|
| *G06F 15/173* | (2006.01) | |
| *G06N 7/08* | (2006.01) | |
| *H04L 67/10* | (2022.01) | |
| *G06N 7/00* | (2006.01) | |
| *G06F 9/30* | (2018.01) | |

(52) U.S. Cl.
CPC .............. *G06N 7/08* (2013.01); *G06N 10/00* (2019.01); *H04L 67/10* (2013.01)

(56) References Cited

U.S. PATENT DOCUMENTS

| | | |
|---|---|---|
| 6,671,661 B1 | 12/2003 | Bishop |
| 7,135,701 B2 | 11/2006 | Amin et al. |
| 7,418,283 B2 | 8/2008 | Amin |
| 7,493,252 B1 | 2/2009 | Nagano et al. |
| 7,533,068 B2 | 5/2009 | Maassen et al. |
| 7,876,248 B2 | 1/2011 | Berkley et al. |
| 8,008,942 B2 | 8/2011 | Van et al. |
| 8,035,540 B2 | 10/2011 | Berkley et al. |
| 8,073,808 B2 | 12/2011 | Rose |
| 8,190,548 B2 | 5/2012 | Choi |
| 8,195,596 B2 | 6/2012 | Rose et al. |
| 8,244,650 B2 * | 8/2012 | Rose ............... B82Y 10/00 708/320 |
| 8,340,439 B2 | 12/2012 | Mitarai et al. |
| 8,421,053 B2 | 4/2013 | Bunyk et al. |
| 8,863,044 B1 | 10/2014 | Casati et al. |
| 9,378,733 B1 | 6/2016 | Vanhoucke et al. |
| D795,416 S | 8/2017 | Blomberg et al. |
| 9,727,824 B2 | 8/2017 | Rose et al. |
| 10,296,846 B2 | 5/2019 | Csurka et al. |
| 10,318,881 B2 | 6/2019 | Rose et al. |
| 10,339,466 B1 | 7/2019 | Ding et al. |
| 10,817,796 B2 | 10/2020 | Macready et al. |
| 2002/0010691 A1 | 1/2002 | Chen |
| 2003/0030575 A1 | 2/2003 | Frachtenberg et al. |
| 2005/0119829 A1 | 6/2005 | Bishop et al. |
| 2006/0041421 A1 | 2/2006 | Ta et al. |
| 2006/0047477 A1 | 3/2006 | Bachrach |
| 2006/0074870 A1 | 4/2006 | Brill et al. |
| 2006/0115145 A1 | 6/2006 | Bishop et al. |
| 2007/0011629 A1 | 1/2007 | Shacham et al. |
| 2007/0162406 A1 | 7/2007 | Lanckriet |
| 2008/0069438 A1 | 3/2008 | Winn et al. |
| 2008/0103996 A1 | 5/2008 | Forman et al. |
| 2008/0132281 A1 | 6/2008 | Kim et al. |
| 2008/0176750 A1 | 7/2008 | Rose et al. |
| 2008/0215850 A1 | 9/2008 | Berkley et al. |
| 2008/0313430 A1 | 12/2008 | Bunyk |
| 2009/0077001 A1 | 3/2009 | Macready et al. |
| 2009/0121215 A1 | 5/2009 | Choi |
| 2009/0171956 A1 | 7/2009 | Gupta et al. |
| 2009/0254505 A1 | 10/2009 | Davis et al. |
| 2009/0278981 A1 | 11/2009 | Bruna et al. |
| 2009/0322871 A1 | 12/2009 | Ji et al. |
| 2010/0010657 A1 | 1/2010 | Do et al. |
| 2010/0185422 A1 | 7/2010 | Hoversten |
| 2010/0228694 A1 | 9/2010 | Le Roux et al. |
| 2010/0332423 A1 | 12/2010 | Kapoor et al. |
| 2011/0022369 A1 | 1/2011 | Carroll et al. |
| 2011/0022820 A1 | 1/2011 | Bunyk et al. |
| 2011/0044524 A1 | 2/2011 | Wang et al. |
| 2011/0047201 A1 | 2/2011 | Macready et al. |
| 2011/0142335 A1 | 6/2011 | Ghanem et al. |
| 2011/0231462 A1 | 9/2011 | Macready et al. |
| 2011/0238378 A1 | 9/2011 | Allen et al. |
| 2011/0295845 A1 | 12/2011 | Gao et al. |
| 2012/0084235 A1 | 4/2012 | Suzuki et al. |
| 2012/0124432 A1 | 5/2012 | Pesetski et al. |
| 2012/0149581 A1 | 6/2012 | Fang |
| 2012/0215821 A1 | 8/2012 | Macready et al. |
| 2012/0254586 A1 | 10/2012 | Amin et al. |
| 2013/0097103 A1 | 4/2013 | Chari et al. |
| 2013/0236090 A1 | 9/2013 | Porikli et al. |
| 2013/0245429 A1 | 9/2013 | Zhang et al. |
| 2014/0025606 A1 | 1/2014 | Macready |
| 2014/0040176 A1 | 2/2014 | Balakrishnan et al. |
| 2014/0152849 A1 | 6/2014 | Bala et al. |
| 2014/0187427 A1 * | 7/2014 | Macready ............... G06N 5/02 706/46 |
| 2014/0201208 A1 | 7/2014 | Satish et al. |
| 2014/0214835 A1 | 7/2014 | Oehrle et al. |
| 2014/0214836 A1 | 7/2014 | Stivoric et al. |
| 2014/0297235 A1 | 10/2014 | Arora et al. |
| 2015/0006443 A1 | 1/2015 | Rose et al. |
| 2015/0161524 A1 | 6/2015 | Hamze |
| 2015/0242463 A1 | 8/2015 | Lin et al. |
| 2015/0248586 A1 | 9/2015 | Gaidon et al. |
| 2015/0269124 A1 | 9/2015 | Hamze et al. |
| 2015/0317558 A1 | 11/2015 | Adachi et al. |
| 2016/0019459 A1 | 1/2016 | Audhkhasi et al. |
| 2016/0042294 A1 | 2/2016 | Macready et al. |
| 2016/0078600 A1 | 3/2016 | Perez Pellitero et al. |
| 2016/0110657 A1 * | 4/2016 | Gibiansky .............. G06N 20/00 706/12 |
| 2016/0191627 A1 * | 6/2016 | Huang .................... H04L 67/10 709/205 |
| 2016/0307305 A1 | 10/2016 | Madabhushi et al. |
| 2017/0132509 A1 | 5/2017 | Li et al. |
| 2017/0255871 A1 | 9/2017 | Macready et al. |
| 2017/0300817 A1 | 10/2017 | King et al. |
| 2017/0357274 A1 | 12/2017 | Baughman et al. |
| 2018/0018584 A1 | 1/2018 | Nock et al. |
| 2018/0025291 A1 | 1/2018 | Dey et al. |
| 2018/0065749 A1 | 3/2018 | Cantrell et al. |
| 2018/0137422 A1 | 5/2018 | Wiebe et al. |
| 2018/0157923 A1 | 6/2018 | El Kaliouby et al. |
| 2018/0165554 A1 | 6/2018 | Zhang et al. |
| 2018/0165601 A1 | 6/2018 | Wiebe et al. |
| 2019/0005402 A1 | 1/2019 | Mohseni et al. |
| 2019/0018933 A1 | 1/2019 | Oono et al. |
| 2019/0180147 A1 | 6/2019 | Zhang et al. |

FOREIGN PATENT DOCUMENTS

| | | |
|---|---|---|
| CN | 101657827 A | 2/2010 |
| CN | 102324047 A | 1/2012 |
| CN | 102364497 A | 2/2012 |
| CN | 102651073 A | 8/2012 |
| CN | 102831402 A | 12/2012 |
| CN | 104050509 A | 9/2014 |
| CN | 102037475 B | 5/2015 |
| CN | 104766167 A | 7/2015 |
| CN | 104919476 A | 9/2015 |
| CN | 106569601 A | 4/2017 |
| JP | 2011008631 A | 1/2011 |
| KR | 20130010181 A | 1/2013 |
| WO | 2009120638 A2 | 10/2009 |
| WO | 2010077997 A1 | 7/2010 |
| WO | 2015193531 A1 | 12/2015 |
| WO | 2016029172 A1 | 2/2016 |
| WO | 2016/089711 A1 | 6/2016 |
| WO | 2016210018 A1 | 12/2016 |
| WO | 2017031356 A1 | 2/2017 |
| WO | 2017031357 A1 | 2/2017 |
| WO | 2017124299 A1 | 7/2017 |
| WO | 2017132545 A1 | 8/2017 |

OTHER PUBLICATIONS

"Cluster Analysis", UIUC, 2013.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Amin, "Effect of Local Minima on Adiabatic Quantum Optimization," Physical Review Letters 100(130503), 2008, 4 pages.
Bach et al., "On the Equivalence between Herding and Conditional Gradient Algorithms," Proceedings of the 29th International Conference on Machine Learning, 2012, 8 pages.
Bach, F. et al., "Optimization with Sparsity-Inducing Penalties," arXiv:1108.0775v2 [cs.LG], Nov. 22, 2011, 116 pages.

(56) References Cited

OTHER PUBLICATIONS

Berkley, A.J. et al., "Tunneling Spectroscopy Using a Probe Qubit," arXiv:1210.6310v2 [cond-mat.supr-con], Jan. 3, 2013, 5 pages.
Brakel, P., Dieleman, S., & Schrauwen. "Training restricted Boltzmann machines with multi-tempering: Harnessing parallelization", 2012.
Chen et al., "Herding as a Learning System with Edge-of-Chaos Dynamics," arXiv:1602.030142V2 [stat.ML], Mar. 1, 2016, 48 pages.
Chen et al., "Parametric Herding," Proceedings of the 13th International Conference on Artificial Intelligence and Statistics (AISTATS), 2010, pp. 97-104.
Chinese Office Action for Application No. CN 2016800606343, dated May 8, 2021, 21 pages (with English translation).
Chinese Office Action for Application No. CN 2019516164, dated Nov. 24, 2021, 33 pages (including English translation).
Courville, A. et al., "A Spike and Slab Restricted Boltzmann Machine," Proceedings of the 14th International Conference on Artificial Intelligence and Statistics (AISTATS), 2011, 9 pages.
Deng, J. et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, V. et al., "On the Challenges of Physical Implementations of RBMs," Proceedings of the 28th AAAI Conference on Artificial Intelligence, vol. 2, Jul. 27, 2014, 7 pages.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Extended European Search Report for EP Application No. 16837862.8, dated Apr. 3, 2019, 12 pages.
Fergus, R. et al., "Semi-Supervised Learning in Gigantic Image Collections," Advances in Neural Information Processing Systems, vol. 22, 2009, 8 pages.
First Office Action issued in Chinese No. 2018101287473 with English translation, dated Jul. 12, 2021, 16 pages.
Freidman, et al., "Learning Bayesian Networks from Data", Internet Movie Database, http://www.imdb.com, 19 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMS with Physical Neural Nets," URL:https://dwave.wordpress.com/2014/01/24/training-dbms-with-physical-neural-nets/, Jan. 24, 2014, 10 pages.
Gömez-Bombarelli et al., "Automatic Chemical Design Using a Data-Driven Continuous Representation of Molecules," arXiv:1610.02415v3: Dec. 2017. (26 pages).
Goodfellow et al., "Generative Adversarial Nets", arXiv:1406.2661v1 [stat.ML], 9 pages, Jun. 10, 2014.
Grassberger, "Entropy Estimates from Insufficient Samplings," arXiv:physics/0307138v2 [physics.data-an], Jan. 4, 2008, 5 pages.
Hjelm, "Boundary-Seeking Generative Adversarial Networks", arXiv:1702.08431v4 [stat.ML], 17 pages, Feb. 21, 2018.
International Search Report and Written Opinion for PCT/US2018/065286, dated Apr. 16, 2019, 11 pages.
International Search Report and Written Opinion for PCT/US2019/017124, dated May 30, 2019, 28 pages.
International Search Report and Written Opinion, dated Oct. 13, 2014, for international Application No. PCT/2014/044421, 13 pages.
International Search Report, dated May 10, 2017, for International Application No. PCT/US2017/015401, 3 pages.
International Search Report, dated Nov. 18, 2016, for International Application No. PCT/US2016/047627, 3 pages.
Jaakkola et al., "Improving the Mean Field Approximation Via the Use of Mixture Distributions," 1998, 11 pages.
Jenatton, R. et al., "Proximal Methods for Hierarchical Sparse Coding," arXiv:1009.2139v4 [stat.ML], Jul. 5, 2011, 38 pages.
Katzgraber et al., "Glassy Chimeras Could Be Blind to Quantum Speedup: Designing Better Benchmarks for Quantum Annealing Machines," Physical Review X(4):021008, 2014, (8 pages).
Khalek, S. et al., "Automated SQL Query Generation for Systematic Testing of Database Engines," ASE '10: Proceedings of the IEEE/ACM international conference on Automated software engineering, 2010, 4 pages.
Krähenbühl, P. et al., "Efficient Inference in Fully Connected CRFs with Gaussian Edge Potentials," arXiv:1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001, 10 pages.
Li, X., et al., "Collaborative Variational Autoencoder for Recommender Systems," Published in KDD, Halifax, NS, Canada, Aug. 13-17, 2017, pp. 305-314.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.
Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Niv, "Reinforcement Learning in the Brain". Journal of Mathematical Psychology, 2009—Elsevier.
Paninski, "Estimation of Entropy and Mutual Information," Neural Computation 15:1191-1253, 2003.
Prakash, "Quantum Algorithms for Linear Algebra and Machine Learning," Doctoral Thesis, Technical Report No. UCB/EECS-2014-211, University of California at Berkeley, 2014, pp. 1-9.
Gal, et al., "Bayesian Convolutional Neural Networks With Bernoulli Approximate Variational Inference". arXiv:1506.02158v6, 2016.
Quattoni, A. et al., "Hidden Conditional Random Fields," IEEE Transactions on Pattern Analysis and Machine Intelligence, 29(10), 2007, 6 pages.
Reed, et al., "Training Deep Neural Networks on Noisy Labels with Bootstrapping," arXiv:1412.6596v3 [cs.CV] Apr. 15, 2015, 11 pages.
Rezende, et al., "Stochastic Backpropagation and Approximate Inference in Deep Generative Models," arXiv:1401.4082v3 [stat.ML] May 30, 2014, 14 pages.
Ross, S. et al., "Learning Message-Passing Inference Machines for Structured Prediction," CVPR 2011, 2011,8 pages.
Sakkaris, et al., "QuDot Nets: Quantum Computers and Bayesian Networks", arXiv:1607.07887v1 [quant-ph] Jul 26, 2016, 22 page.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Strub, F., et al. "Hybrid Collaborative Filtering with Autoencoders," arXiv:1603.00806v3 [cs.IR], Jul. 19, 2016, 10 pages.
Sukhbaatar et al., "Training Convolutional Networks with Noisy Labels," arXiv:1406.2080v4 [cs.CV] Apr. 10, 2015, 11 pages.

(56) References Cited

OTHER PUBLICATIONS

Tieleman, T., "Training Restricted Boltzmann Machines using Approximation to the Likelihood Gradient," ICML '08: Proceedings of the 25th international conference on Machine learning, 2008, 8 pages.
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=I&oi=scholar, 99 pages.
Van de Meent, J-W., Paige, B., & Wood, "Tempering by subsampling", 2014.
van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, PHYSICAL REVIEW B 94, 195105 (2016), 5 pages.
Wang, W., Machta, J., & Katzgraber, H. G. "Population annealing: Theory and applications in spin glasses", 2015.
Williams, "Simple Statistical Gradient-Following Algorithms for Connectionist Reinforcement Learning," College of Computer Science, Northeastern University, Boston, MA, 1992, 27 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zhu, X. et al., "Combining Active Learning and Semi-Supervised Learning Using Gaussian Fields and Harmonic Functions," ICML 2003 workshop on the Continuum from Labeled to Unlabeled Data in Machine Learning and Data Mining, 2003, 8 pages.
Zojaji, et al., "A Survey of Credit Card Fraud Detection Techniques: Data and Technique Oriented Perspective", arXiv:1611.06439 Nov. 19, 2016. https://arxiv.org/abs/1611.06439.
Amin, et al., "Quatum Boltzmann Machine". arXiv:1601.02036v1, Jan. 8, 2016.
Anonymous, "A Robust Learning Approach to Domain Adaptive Object Detection". CVPR, 2019.
Azadi, et al., "Auxiliary Image Regulation for Deep CNNs with Noisy Labels". arXiv:1511.07069v2 (2016).
B. Sallans and G.E. Hitton , "Reinforcement Learning with Factored States and Actions". JMLR, 5:1063-1088, 2004.
Bahnsen, et al., "Feature Engineering Strategies for Credit Card Fraud Detection", Expert systems with applications Elsevier Jun. 1, 2016. https://www.sciencedirect.com/science/articie/abs/pii/S0957417415008386?via%3Dihub.
Barron-Romero, Carlos , "Classical and Quantum Algorithms for the Boolean Satisfiability Problem", CoRR, Abs/1510.02682 )Year:2015).
Bearman, et al., "What's the Point: Semantic Segmentation with Point Supervision". ECCV, Jul. 23, 2016. https://arxiv.org/abs/1506.02106.
Bell, et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya, et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian, et al., "The Ising Model: teaching an old problem new tricks", D-wave systems. 2 (year 2010), 32 pages.
Bielza, et al., "Bayesian networks in neuroscience: a survey", Oct. 16, 2014, Frontiers in Computational Neuroscience, vol. 8, Article 131, p. 1-23 (Year: 2014).
Bolton, et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda, et al., "Importance Weighted Autoencoders", arXiv:1509.00519 Nov, 7, 2016. https://arxiv.org/abs/1509.00519.
Buss, "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen, et al., "Domain Adaptive Faster R-CNN for Object Detection in the Wild". IEEE Xplore, 2018. https://arxiv.org/abs/1803.03243.
Chen, et al., "Stochastic Gradient Hamiltonian Monte Carlo", arXiv:1402.4102 May 12, 2014. https://arxiv.org/abs/1402.4102.
Cho, Kyunghyun , et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A. , "Parallel tempering is efficient for learning restricted Boltzmann machines", 2010.
Courbariaux, M. , et al., "Binarized Neural Networks: Training Neural Networks with Weights and Activations Constrained to +1 or-1". http://arxiv.org/pdf/1602.02830.pdf.
Dai, et al., "Generative Modeling of Convolutional Neural Networks". ICLR 2015.
Doersch, "Tutorial on variational autoencoders", arXiv:1606.05908 Jan. 3, 2021. https://arxiv.org/abs/1606.05908.
Fabius, Otto, et al., "Variational Recurrent Auto-Encoders", Accepted as workshop contributions at ICLR 2015, 5 pages.
Fischer, A. & Igel, C. , "A bound for the convergence rate of parallel tempering for sampling restricted Boltzmann machines", 2015.
G. Hinton, N. Srivastava, et. al , "Improving neural networks by preventing co-adaptation of feature detectors". CoRR , abs/1207.0580, 2012.
G.A. Rummery and M. Niranjan , "Online Q-Learning using Connectionist Systems". CUED/FINFENG/TR 166, Cambridge, UK, 1994.
Glynn , "Likelihood ratio gradient estimation for stochastic systems". Communications of the ACM, 1990. https://dl.acm.org/doi/10.1145/84537.84552.
International Search Report for corresponding PCT Application No. PCT/US2017/053303, dated Jan. 4, 2018, 3 pages.
Written Opinion for corresponding PCT Application No. PCT/US2017/053303, dated Jan. 4, 2018, 8 pages.
"An implementation of the high-throughput computing system using the GPU (005)", no English translations, 2019-516164, IEICE Technical Report, vol. 114 No. 302, Nov. 13-14, 2014 , 12 pages.
"Neuro-computing for Parallel and Learning Information Systems", no English translation 2019-516164, www.jstage.jst.go.jp/article/sicej/1962/27/3/27_3_255/_article/-char/ja, Nov. 14, 2021, 17 pages.
Japanese Office Action for Application No. JP 2019-516164, dated Nov. 24, 2021, 33 pages (including English translation).
Miyata et al., "Consideration of 2D-FFT by Decomposition-of-Large Scale Data on Multi-GPU", no English translations, IEICE Technical Report, vol. 114 No. 155, Computer Systems Jul. 28-30, 2014, Abstract, 12 pages.
Yoshihara et al., "Estimating the Trend of Economic Indicators by Deep Learning", no English translations, 2019-516164, Graduate School of System Informatics, Kobe University, 28 Annual Conferences of Japanese Society for Artificial Intelligence 2014, 10 pages.
Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb31546d5698a.
Rasmus, Antti , et al., "Semi-Supervised Learning with Ladder Networks", arXiv:1507.02672v2 [cs.NE] Nov. 24, 2015, 19 pages.
Rezende, Danilo J, et al., "Variational Inference with Normalizing Flows", Proceedings of the 32nd International Conference on Machine Learning, Lille, France 2015, JMLR: W&CP vol. 37, 9 pages.
Rolfe, "Discrete variational autoencoders" arXiv:1609.02200 Apr. 22, 2017. https://arxiv.org/abs/1609.02200.
Salakhutdinov, R. , "Learning deep Boltzmann machines using adaptive MCMC", 2010.

(56) References Cited

OTHER PUBLICATIONS

Salakhutdinov, R., "Learning in Markov random transitions.elds using tempered", 2009.

Salakhutdinov, R. & Murray, I., "On the quantitative analysis of deep belief networks", 2008.

Saliman, Tim, "A Structured Variational Auto-encoder for Learning Deep Hierarchies of Sparse Features", arXiv:1602.08734v1 [stat.ML] Feb. 28, 2016, 3 pages.

Salimans, Tim, et al., "Markov Chain Monte Carlo and Variational Inference: Bridging the Gap", arXiv:1410.6460v4 [stat.CO] May 19, 2015, 9 pages.

Schulman, et al., "Gradient estimation using stochastic computing graphs". arXiv:1506.05254, Jan. 5, 2016. https://arxiv.org/abs/1506.05254.

Schwartz-Ziv, et al., "Opening the black box of Deep Neural Networks via Information", arXiv:1703.00810 Apr. 29, 2017. https://arxiv.org/abs/1703.00810.

Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.

Shahriari, et al., "Taking the human out of the loop: A review of bayesian optimization", Proceedings of the IEEE 104 Jan. 1, 2016.

Silver, et al., "Mastering the game of Go with deep neural networks and tree search". Nature, 529, 484489, 2016.

Smelyanskiy, et al., "A near-term quantum computing approach for hard computational problems in space exploration" arXiv preprint arXir:1204.2821 (year:2012).

Sonderby, et al., "Ladder Variational Autoencoders", arXiv:1602.02282v3 [stat.ML] May 27, 2016, 12 pages.

Sprechmann, et al., "Dictionary learning and sparse coding for unsupervised clustering", in 2010 IEEE international conference on acoustics, speech and signal processing (pp. 2042-2045) IEEE (year:2010).

Sutton, "Learning to Predict by the Methods of Temporal Differences". https://webdocs.cs.ualberta.ca/ sutton/papers/sutton-88-with-erratum.pdf.

Sutton, R., et al., "Policy gradient methods for reinforcement learning with function approximation". Advances in Neural Information Processing Sytems, 12, pp. 1057-1063, MIT Press, 2000.

Suzuki, et al., "Joint Multimodal Learning With Deep Generative Models", Nov. 7, 2016, arXiv:1611.0189v1 (Year 2016).

Szegedy, et al., "Rethinking the Inception Architecture for Computer Vision", 2016, Proceedings of the IEEE Conference on Computer Vision and Pattern Recognition (CVPR), pp. 2818-2826 (Year: 2016).

Tieleman, T. & Hinton, G., "Using fast weights to improve persistent contrastive divergence", 2009.

Tokui, et al., "Evaluating the variance of likelihood-ratio gradient estimators", Proceedings of the 34th International Conference on Machine Learning, 2017. http://proceedings.mlr.press/v70/tokui17a.html.

Tripathi, et al., "Survey on credit card fraud detection methods", International Journal of Emerging Technology and Advanced Engineering Nov. 12, 2012.

Tucker, et al., "Rebar: Low-variance, unbiased gradient estimates for discrete latent variable models". arXiv:1703.07370, Nov. 6, 2017. https://arxiv.org/abs/1703.07370.

Vahdat, "Toward Robustness against Label Noise in Training Deep Disciminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv:1802.04920 May 25, 2018. https://arxiv.org/abs/1802.04920.

Zheng, et al., "Graph regularized sparse coding for image representation", IEEE transaction on image processing, 20 (5), (Year: 2010) 1327-1336.

Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.

Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.

Xie, et al., "A Theory of Generative ConvNet". ICML 2016.

Xiao, et al., "Learning from massive noisy labeled data for image classification". The IEEE Conference on Computer Vision and Pattern Recognition (CVPR) 2015.

Wittek, Peter, "What Can We Expect from Quantum Machine Learning". Yandex 1-32 School of Data Analysis Conference Machine Learning: Prospects and Applications, Oct. 5, 2015. pp. 1-16.

Van Det Maaten, et al., "Hidden unit conditional random Fields". 14th International Conference on Artificial Intelligence and Statistics, 2011.

Veit, et al., "Learning From Noisy Large-Scale Datasets With Minimal Supervision". arXiv:1701.01619v2, Apr. 10, 2017. https://arxiv.org/abs/1701.01619.

Wan, L., et al., "Regularization of Neural Networks using DropConnec". ICML 2013.

Wang, et al., "Classification of common human diseases derived from shared genetic and environmental determinants", Nature Genetics Aug. 7, 2017. https://www.nature.com/articles/ng.3931.

Welling, et al., "Bayesian learning via stochastic gradient langevin dynamics", ICML Jun. 28, 2011. https://dl.acm.org/doi/10.5555/3104482.3104568.

Wiebe, Nathan, et al., "Quantum Inspired Training for Boltzmann Machines", arXiv:1507.02642v1 [cs.LG] Jul. 9, 2015, 18 pages.

Neven, et al., "Training a binary classifier with the quantum adiabatic algorithm", arXiv preprint arXivc:0811.0416, 2008, 11 pages.

Neal, et al., "Mcmc Using Hamiltonian Dynamics", Handbook of Markov Chain Monte Carlo 2011.

Grathwohl, et al., "Backpropagation through the void: Optimizing control variates for black-box gradient etimation". arXiv:1711.00123, Feb. 23, 2018. https://arxiv.org/abs/1711.00123.

Gregor, et al., "Deep autoregressive networks". arXiv:1310.8499, May 20, 2014. https://arxiv.org/abs/1310.8499.

Gregor, Karol, et al., "DRAW: A Recurrent Neural Network For Image Generation", Proceedings of the 32nd International Conference on Machine Leaning, Lille, France, 2015, JMLR: W&CP vol. 37. Copyright 2015, 10 pages.

Gu, et al., "Muprop: Unbiased backpropagation for stochastic neural networks", arXiv:1511,05176, Feb. 25, 2016, https://arxiv.org/abs/1511.05176.

Hees, "Setting up a Linked Data mirror from RDF dumps", Jörn's Blog, Aug. 26, 2015. SciPy Hierarchical Clustering and Dendrogram Tutorial | Jörn's Blog (joernhees.de).

Heess, N., et al., "Actor-Critic Reinforcement Learning with Energy-based Policies". JMLR, 24:43-57, 2012.

Heidrich-Meisner, et al., "Reinforcement Learning in a Nutshell". http://image.diku.dk/igel/paper/RLiaN.pdf.

Hidasi, et. al., "Session-based recommendations with recurrent neural networks", ICRL Mar. 29, 2016. https://arxiv.org/abs/1511.06939.

Hinton, Geoffrey, "A Practical Guide to Training Restricted Boltzmann Machines", Version 1, Department of Computer Science University of Toronto, Aug. 2, 2010, 21 pages.

Murphy, "Machine Learning: a probalistic perspective", MIT Press, 2012. http://noiselab.ucsd.edu/ECE228/Murphy_Machine_Learning.pdf.

Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.

Hinton, Geoffrey E, et al., "Reducing the Dimensionality of Data with Neural Networks", Science, wwwsciencemag.org, vol. 313, Jul. 28, 2006, pp. 504-507.

Humphrys, M., http://computing.dcu.ie/ humphrys/PhD/ch2.html.

(56) References Cited

OTHER PUBLICATIONS

Hurley, Barry, et al., "Proteus: A hierarchical Portfolio of Solvers and Transformations", arXiv:1306.5606v2 [cs.AI], Feb. 17, 2014, 17 pages.
Husmeier, "Introduction to Learning Bayesian Networks from Data", Probabilistic Modeling in Bioinformatics and Medical Informatics 2005. https://link.springer.com/chapter/10.1007/1-84628-119-9_2.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", In CVPR 2011 (pp. 1697-1704) IEEE. June,Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, et al., "Adam: A method for stochastic optimization", arXiv:1412.6980 Jan. 30, 2017. https://arxiv.org/abs/1412.6980.
Kingma, et al., "Auto-encoding variational bayes". arXiv:1312.5258v1, May 1, 2014. https://arxiv.org/abs/1312.6114.
Kingma, Diederik P, et al., "Semi-Supervised Learning with Deep Generative Models", arXiv:1406.5298v2 [cs.LG], Oct. 31, 2014, 9 pages.
N. Srivastava, G. Hinton, et. al , "Dropout: A Simple Way to Prevent Neural Networks from Overtting". ICML 15 (Jun):19291958, 2014.
Korenkevych, et al., "Benchmarking quantum hardware for training of fully visible boltzmann machines", arXiv:1611.04528 Nov. 14, 2016. https://arxiv.org/abs/1611.04528.
Krause, et al., "The Unreasonable Effectiveness of Noisy Data for Fine-Grained Recognition", 2016, Springer International Publishing AG, ECCV 2016, Part III, LNCS 9907, pp. 301-320 (Year:2016).
L.Wan, M. Zieler, et. al. , "Regularization of Neural Networks using DropConnect". ICML, 2013.
Le Roux, Nicolas, et al., "Representational Power of Restricted Boltzmann Machines and Deep Belief Networks", Dept. IRO, University of Montreal Canada, Technical Report 1294, Apr. 18, 2007, 14 pages.
Lee, et al., "Efficient sparse coding algorithm", NIPS, 2007,pp. 801-808.
Lee, H., et al., "Sparse deep belief net model for visual area v2". Advances in Neural Information Processing Systems, 20 . MIT Press, 2008.
Li, et al., "R/'enyi Divergence Variational Inference", arXiv:1602.02311 Oct. 28, 2016. https://aixiv.org/abs/1602.02311.
Lin, et al., "Efficient Piecewise Training of Deep Structured Models for Semantic Segmentation". arXiv:1504.01013v4, 2016.
Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115; 1989, pp. 439-454.
Maddison, et al., "The concrete distribution: A continuous relaxation of discrete random variables", arXiv:1611.00712 Mar. 5, 2017. https://arxiv.org/abs/1611.00712.
Makhzani, Alireza , et al., "Adversarial Autoencoders", arXiv:1511.05644v2 [cs.LG], May 25, 2016, 16 pages.
Mandt, et al., "A Variational Analysis of Stochastic Gradient Algorithms", arXiv:1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels". In the IEEE Conference on Computer Vision and Pattern Recognition (CVPR), 2016.

Mnih, et al., "Neural variational inference and learning in belief networks". arXiv:1402.0030 Jun. 4, 2016. https://arxiv.org/abs/1402.0030.
Muthukrishnan, et al., "Classical and quantum logic gates: an introduction to quantum computing", Quantum information seminar, )Year: 1999) 22 pages.
Mnih, Andriy , et al., "Variational Inference for Mote Carlo Objectives", Proceedings of the 33rd International Conference on Machine Learning, New York, NY USA, 2016, JMLR: W&CP vol. 48, 9 pages.
Molchanov, Dmitry , et al., "Variational Dropout Sparsifies Deep Neural Networks", https://arxiv.org/pdf/1701.05369v1.pdf, Jan. 19, 2017.
Murphy, "A Brief Introduction to Graphical Models and Bayesian Networks", Oct. 14, 2001. https://www.cs.ubc.ca/~murphyk/Bayes/bayes_tutorial.pdf.
Nowozin, Sebastian, et al., "f-GAN: Training Generative Neural Samplers using Variational Divergence Minimization", arXiv:1606.00709v1 [stat.ML], 17 pages., Jun. 2, 2016.
Olshausen, Bruno A, et al., "Emergence of simple cell receptive field properties by learning a sparse code for natural images", NATURE, vol. 381, Jun. 13, 1996, pp. 607-609.
Patrini, et al., Making Neural Networks robust to label noise: a loss correction approach. arXiv: 1609.03683 (2016).
Phua, et al., "A comprehensive survey", arXiv: 1009.6119 Aug. 30, 2010. https://arxiv.org/abs/1009.6119.
Achille et Soatto, "Information Dropout: Learning Optimal Representations Through Noise" Nov. 4, 2016, ICLR, arXiv:1611.01353v1, pp. 1-12. (Year: 2016).
Awasthi et al., "Efficient Learning of Linear Separators under Bounded Noise" Mar. 12, 2015, arXiv: 1503.03594v1, pp. 1-23. (Year: 2015).
Awasthi et al., "Learning and 1-bit Compressed Sensing under Asymmetric Noise" Jun. 6, 2016, JMLR, pp. 1-41. (Year 2016).
Benedetti et al., "Quantum-assisted learning of graphical models with arbitrary pairwise connectivity" Sep. 8, 2016, arXiv: 1609.02542v1, pp. 1-13. (Year: 2016).
Blanchard et al., "Classification with Asymmetric Label Noise: Consistency and Maximal Denoising" Aug. 5, 2016, arXiv:1303.1208v3, pp. 1-47. (Year: 2016).
Bornschein et al., "Bidirectional Helmholtz Machines" May 25, 2016, arXiv: 1506.03877v5. (Year: 2016).
First Office Action dated Nov. 29, 2021 in CN App No. 2016800731803. (English Translation).
Hinton et al., "A Practical Guide to Training Restricted Boltzmann Machines," Springer, pp. 599-619, Jan. 1, 2012.
Hinton, Geoffrey E. . Training products of experts by minimizing contrastive divergence. Neural Computation, 14:1771-1800, 2002.
Hinton, Geoffrey, Simon Osindero, and Yee-Whye Teh. A fast learning algorithm for deep belief nets. Neural computation, 18(7):1527-1554, 2006.
Jain et al., "Estimating the class prior and posterior from noisy positives and unlabeled data" Jun. 28, 2016, arXiv:1606.08561v1, pp. 1-19. (Year: 2016).
Jordan, Michael I., Zoubin Ghahramani, Tommi S Jaakkola, and Lawrence K Saul. An introduction to variational methods for graphical models. Machine learning, 37(2):183-233, 1999.
Ke et al., "Variational Convolutional Networks for Human-Centric Annotations" Nov. 20, 2016, pp. 120-135. (Year: 2016).
Korenkevych et al., "Benchmarking Quantum Hardware for Training of Fully Visible Boltzmann Machines" Nov. 14, 2016, arXiv:1611.04528v1, pp. 1-22. (Year: 2016).
Le, Quoc , Marc'Aurelio Ranzato, Rajat Monga, Matthieu Devin, Greg Corrado, Kai Chen, Jeff Dean, and Andrew Ng. Building high-level features using large scale unsupervised learning. In ICML '2012, 2012.
LeCun, Y., L. Bottou, Y. Bengio, and P. Haffner. Gradient based learning applied to document recognition. Proc. IEEE, 1998.
Liu et Tao, "Classification with Noisy Labels by Importance Reweighting" Mar. 2016, pp. 447-461. (Year: 2016).

(56) References Cited

OTHER PUBLICATIONS

Long, Philip M and Rocco Servedio. Restricted boltzmann machines are hard to approximately evaluate or simulate. In Proceedings of the 27th International Conference on Machine Learning (ICML-10), pp. 703-710, 2010.

Menon et al., "Learning from Binary Labels with Instance-Dependent Corruption" May 4, 2016, pp. 1-41. (Year: 2016).

Non-Final Office Action Issued in U.S. Appl. No. 15/753,661 dated Dec. 9, 2021, 15 pages.

Non-Final Office Action Issued in U.S. Appl. No. 15/822,884 dated Feb. 17, 2022, 45 pages.

Omidshafiei et al., "Hierarchical Bayesian Noise Inference for Robust Real-time Probabilistic Object Classification" Jul. 14, 2016, arXiv: 1605.01042v2, pp. 1-9. (Year: 2016).

Ororbia et al., "Online Semi-Supervised Learning with Deep Hybrid Boltzmann Machines and Denoising Autoencoders" Jan. 18, 2016, ICLR, arXiv: 1511.06964v7, pp. 1-17. (Year: 2016).

Serban et al., "Multi-Modal Variational Encoder-Decoders" Dec. 1, 2016, arXiv: 1612.00377v1, pp. 1-18. (Year: 2016).

Shah et al., "Feeling the Bern: Adaptive Estimators for Bernoulli Probabilities of Pairwise Comparisons" Mar. 22, 2016, pp. 1-33. Year: 2016).

Somma, R., S Boixo, and H Barnum. Quantum simulated annealing. arXiv preprint arXiv:0712.1008, 2007.

Somma, RD, S Boixo, H Barnum, and E Knill. Quantum simulations of classical annealing processes. Physical review letters, 101(13):130504, 2008.

Suzuki, "Natural quantum reservoir computing for temporal information processing", Scientific Reports, Nature Portfolio, Jan. 25, 2022.

Tosh, Christopher, "Mixing Rates for the Alternating Gibbs Sampler over Restricted Boltzmann Machines and Friends" Jun. 2016. Year: 2016).

Wang, et al., "Paired Restricted Boltzmann Machine for Linked Data" Oct. 2016. (Year: 2016).

Xu et Ou "Joint Stochastic Approximation Learning of Helmholtz Machines" Mar. 20, 2016, ICLR arXiv: 1603.06170v1, pp. 1-8. (Year: 2016).

Nalisnick, Eric, Lars Hertel, and Padhraic Smyth. "Approximate inference for deep latent gaussian mixtures." NIPS Workshop on Bayesian Deep Learning. vol. 2. 2016. (Year: 2016).

Non-Final Office Action Issued in U.S. Appl. No. 16/562,192 dated Apr. 4, 2022, 37 pages.

Salimans, Tim, and David A. Knowles. "Fixed-form variational posterior approximation through stochastic linear regression." Bayesian Analysis 8.4 (2013): 837-882. (Year: 2013).

Salimans, Tim. "A structured variational auto-encoder for learning deep hierarchies of sparse features." arXiv preprint arXiv: 1602.08734 (2016). (Year: 2016).

\* cited by examiner

SYSTEMS, METHODS AND APPARATUS FOR SAMPLING FROM A SAMPLING SERVER

FIELD

This disclosure generally relates to machine learning systems employing a sampling server.

BACKGROUND

Machine Learning

Machine learning relates to methods and circuitry that can learn from data and make predictions based on data. In contrast to methods or circuitry that follow static program instructions, machine learning methods and circuitry can include deriving a model from example inputs (such as a training set) and then making data-driven predictions.

Machine learning is related to optimization. Some problems can be expressed in terms of minimizing a loss function on a training set, where the loss function describes the disparity between the predictions of the model being trained and observable data.

Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Machine learning can be used in situations where explicit approaches are considered infeasible. Example application areas include optical character recognition, search engine optimization, and computer vision.

Quantum Processor

A quantum processor is a computing device that can harness quantum physical phenomena (such as superposition, entanglement, and quantum tunneling) unavailable to non-quantum devices. A quantum processor may take the form of a superconducting quantum processor. A superconducting quantum processor may include a number of qubits and associated local bias devices, for instance two or more superconducting qubits. An example of a qubit is a flux qubit. A superconducting quantum processor may also employ coupling devices (i.e., "couplers") providing communicative coupling between qubits. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution (i.e., the rate at which the Hamiltonian changes).

As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. As used herein an "adiabatic" evolution is an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

If the evolution is slow enough that the system is always in the instantaneous ground state of the evolution Hamiltonian, then transitions at anti-crossings (when the gap size is smallest) are avoided. Other evolution schedules, besides the linear evolution described above, are possible including non-linear evolution, parametric evolution, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. While classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present to annealing. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P,$$

where A(t) and B(t) are time dependent envelope functions. For example, A(t) can change from a large value to substantially zero during the evolution and $H_E$ can be thought of as an evolution Hamiltonian similar to $H_e$ described in the context of adiabatic quantum computation above. The disorder is slowly removed by removing $H_D$ (i.e., by reducing A(t)).

Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to process at least some problems having size and/or connectivity greater than (and/or at least not fully provided by) the working graph of an analog processor. Computational systems and methods are described which, at least in some implementations, allow for the computation of at least some problem graphs which have representations which do not fit within the working graph of an analog processor (e.g. because the problem graphs require more computation devices and/or more/other couplers than the processor provides).

A computational system for use in machine learning may be summarized as including at least one digital processor core; and at least one nontransitory processor-readable medium communicatively coupleable to the at least one digital processor core and that stores at least one of processor-executable instructions or data which, when executed by the at least one digital processor core, causes the at least one digital processor core to implement a sampling server that: receives an initial set of parameters for an iteration of a machine learning process that is executing in parallel with the sampling server on a separate at least one digital processor core from the at least one digital processor core on which the sampling server is implemented; generates a first set of samples based on the initial set of parameters temporarily in parallel with execution of the machine learning process; and provide the first set of samples generated by sampling server as implemented by the at least one digital processor core for use in a further iteration of the machine learning process. The sampling server executes concurrently or even simultaneously, with the machine learning process, overlapping at least a portion thereof.

The at least one digital processor core that implements the sampling server can provide a first set of functions along with the first set of samples generated by sampling server to one or more other processor cores that are executing the machine learning algorithm, for instance on an given problem. The first set of functions can include first- and second-order statistics.

The at least one digital processor core that implements the sampling server can draw samples from a Boltzmann distribution, for instance from a Chimera structured Boltzmann distribution. The at least one digital processor core that implements the sampling server can draw samples via at least one of Markov Chain of single temperature Gibbs sampling, simulated tempering, parallel tempering, population annealing, and annealed importance sampling.

The at least one digital processor core that implements the sampling server can provide a current set of parameters from the sampling server; and receive a set of quantum processor generated samples from the at least one quantum processor. The at least one digital processor core that implements the sampling server can perform post processing on the samples received from the quantum processor.

The sampling server may, for example, send samples, functions of samples and an approximation to a log partition function to the at least one separate digital processor core on which the machine learning process executes.

The sampling server may, for example, iteratively receive additional sets of parameters for each of a number of iterations of the machine learning process that is executing in parallel with the sampling server on the separate at least one digital processor core from the at least one digital processor core on which the sampling server is implemented; iteratively generate an additional sets of samples based on respective ones of the additional sets of parameters temporarily in parallel with execution of the machine learning process; and iteratively provide the additional sets of samples generated by sampling server as implemented by the at least one digital processor core for use in the iterations of the machine learning process.

The computational system for use in machine learning may be summarized as further including at least one digital processor core that executes the machine learning process, for example on the given problem. The machine learning process may, for example, maximize a log-likelihood of a generative model.

The at least one digital processor core on which the sampling server is implemented can be a first processor core of a graphical processor unit with a memory space, and the separate at least one digital processor core that executes the machine learning process can be a second processor core of the graphical processor unit and shares the memory space with the first processor core of the graphical processor unit. The at least one digital processor core on which the sampling server is implemented can be a processor core of a first graphical processor unit and the separate at least one digital processor core that executes the machine learning process can be a processor core of a second graphical processor unit, the second graphical processor unit separate and distinct from the first graphical processor unit. The first graphical processing unit can be part of a first computer and the second graphical processing unit can be part of a second computer, the second computer separate and distinct from the first computer. The at least one digital processor core on which the sampling server is implemented can include a plurality of digital processor cores of a plurality of processors that are separate and distinct from one another, and the plurality of processors can be components of a plurality of computers, the computers which can from a cluster of machines communicatively coupled via a network infrastructure.

The computational system for use in machine learning may be summarized as further including one or more quantum processors that draw samples from a distribution based at least in part on the current set of parameters provided by the sampling server. The quantum processor(s) may perform chain embedding before drawing samples.

A computational system for use in machine learning may include a first digital processor core or set of cores (i.e., hardware processor circuitry executing software or firmware instructions stored on nontransitory computer- or processor-readable media) and a sampling server (i.e., hardware processor circuitry executing software or firmware instructions stored on nontransitory computer- or processor-readable media) implemented on a second digital processor core or set of cores. The digital processor core(s) that executes the machine learning algorithm maximizes the log-likelihood of a generative model. The sampling server is communicatively coupled to the first digital processor core(s) that execute the machine learning algorithm and receives an initial set of parameters from the first digital processor core(s), draws samples from a distribution based on the initial set of parameters and sends the samples and functions of the samples to the first digital processor core(s). The functions of the samples may be first- and second-order statistics. The sampling server may draw samples from a Boltzmann distribution. The Boltzmann distribution may be Chimera structured. The sampling server may draw samples via any one or more of Markov Chain of single temperature Gibbs sampling, simulated tempering, parallel tempering, population annealing, annealed importance sampling. The computational system may further comprise a quantum processor in communicative coupling with the sampling server. The quantum processor periodically receives a current set of parameters from the sampling server, draws samples from a distribution and sends the samples to the sampling server, and the sampling server performs post processing on the samples received from the quantum processor before sending the samples to the first digital processor core or set of cores. The quantum processor may perform chain embedding before drawing samples. The sampling server may share memory space with the digital processor on a GPU. The sampling server may be on a different GPU. The sampling server may be on a different machine. The sampling server may be on a cluster of machines over a network.

A method for machine learning employing a first digital processor core or set of cores and a sampling server implemented on a second digital processor core or set of cores includes the first digital processor core or set of cores (i.e., hardware processor circuitry executing software or firmware instructions stored on nontransitory computer- or processor-readable media) initializing an initial set of parameters, the first digital processor core(s) sending the initial set of parameters to the sampling server, the first digital processor core(s) maximizing the log-likelihood of a generative model in parallel with the sampling server drawing samples from a distribution based on the initial set of parameters and calculating functions of the samples, the sampling server sending the samples to the first digital processor core(s), and the first digital processor core(s) using the samples to learn the distribution by maximizing the log-likelihood of the generative model. The functions of the samples may be first- and second-order statistics. The distribution may be a Boltzmann distribution. The sampling server may draw samples via any one or more of Markov Chain of single temperature Gibbs sampling, simulated tempering, parallel tempering, population annealing, annealed importance sampling. The method of claim may further comprise a quantum processor in communicative coupling with the sampling server. The digital processor sends a set of initial parameters corresponding to the distribution to be learned to the sampling server, the sampling server uses the initial parameters to draws a first set of samples from the distribution, thereby producing updated parameters, the sampling server sending the first set of samples and functions of the samples to the first digital processor core(s), periodically or intermittently the sampling server sends the updated parameters to the quantum processor, the quantum processor uses quantum hardware to draw a second set of samples corresponding to the updated parameters, the quantum processor returns the second set of samples to the sampling server, the sampling server uses the second set of samples to update the first set of samples to produce a third set of samples corresponding to the updated parameters and the second set of samples, the sampling server returns the third set of samples to the first digital processor core or set of cores, and the first digital processor core(s) uses the third set of samples to maximize the log-likelihood of a generative model. The functions of the samples may be first- and second-order statistics. The method may further comprise the quantum processor performing chain embedding before drawing samples.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks and associated hardware components or circuitry have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
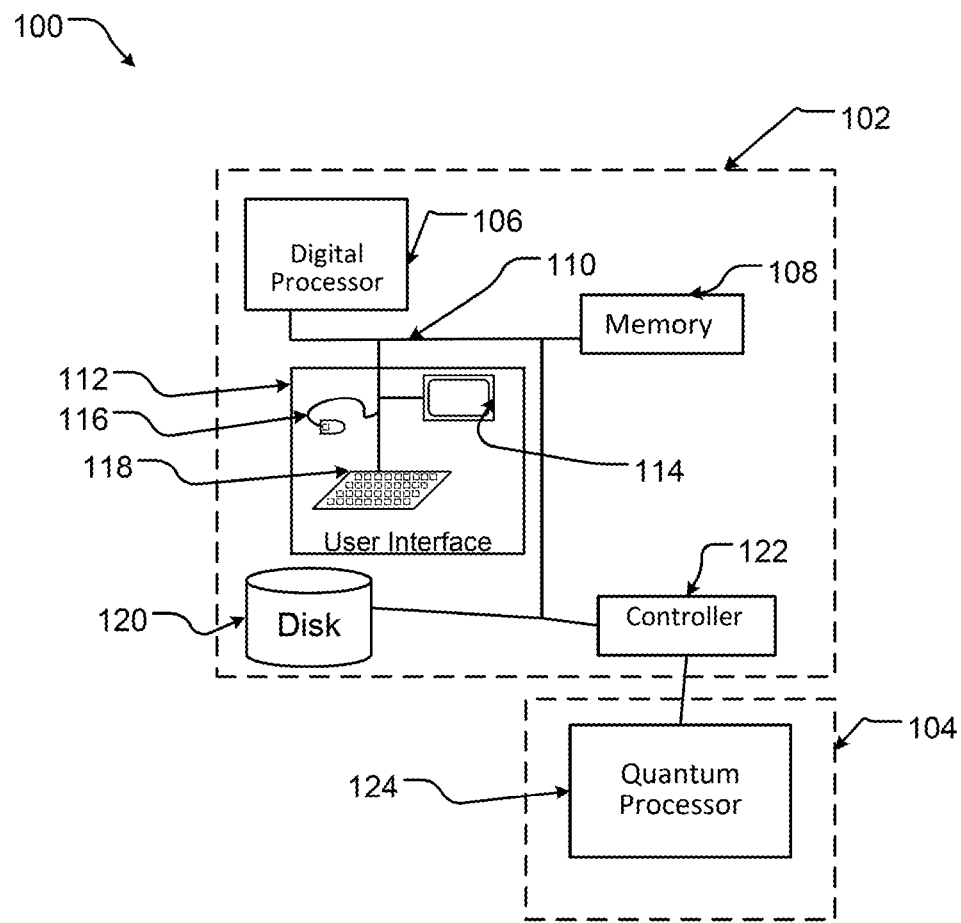
FIG. 1 is a schematic diagram that illustrates an exemplary hybrid computer including a digital processor and an analog processor in accordance with the present systems, devices, methods, and articles.

FIG. 1 illustrates a hybrid computing system 100 including a digital computer 102 coupled to an analog computer 104. In some implementations the analog computer 104 is a quantum computer. The exemplary digital computer 102 includes a digital processor 106 that may be used to perform classical digital processing tasks.

Digital computer 102 may include at least one digital processor 106 with one or more cores, at least one system memory 108, and at least one system bus 110 that couples various system components, including system memory 108 to digital processor 106.

The digital processor 106 may be any circuitry that forms a logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 120. Non-volatile memory 120 may take a variety of forms, including: spinning media for instance a hard disk drive (HDD) for reading from and writing to a magnetic hard disk and/or an optical disk drive for reading from and writing to removable optical disks, and/or non-spinning media for instance a solid state drive (SSD) for reading from and writing to solid state memory. The optical disk can be a CD-ROM or DVD, while the magnetic disk can be a magnetic floppy disk or diskette or one or more magnetic disc platters. Non-volatile memory 120 may communicate with digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for digital computer 102.

Although digital computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory or in a solid-state drive that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104.

In some implementations system memory 108 may store processor- or computer-readable calculation instructions to perform pre-processing, co-processing, and post-processing to analog computer 104. System memory 108 may store at set of analog computer interface instructions to interact with the analog computer 104.

Analog computer 104 may include an analog processor such as quantum processor 124. The analog computer 104 can be provided in an isolated environment, for example, in an isolated environment that shields the internal elements of the quantum computer from heat, magnetic field, and other external noise (not shown) and/or which cools the analog processor to temperatures (i.e., critical temperature) at or below which the circuitry of the analog processor becomes superconductive. In contrast, the digital computer 102 will typically operate at much higher temperatures (e.g., room temperature) at which superconductivity does not occur and/or may employ materials that do not superconduct even at or below the critical temperature.

Figure 2:
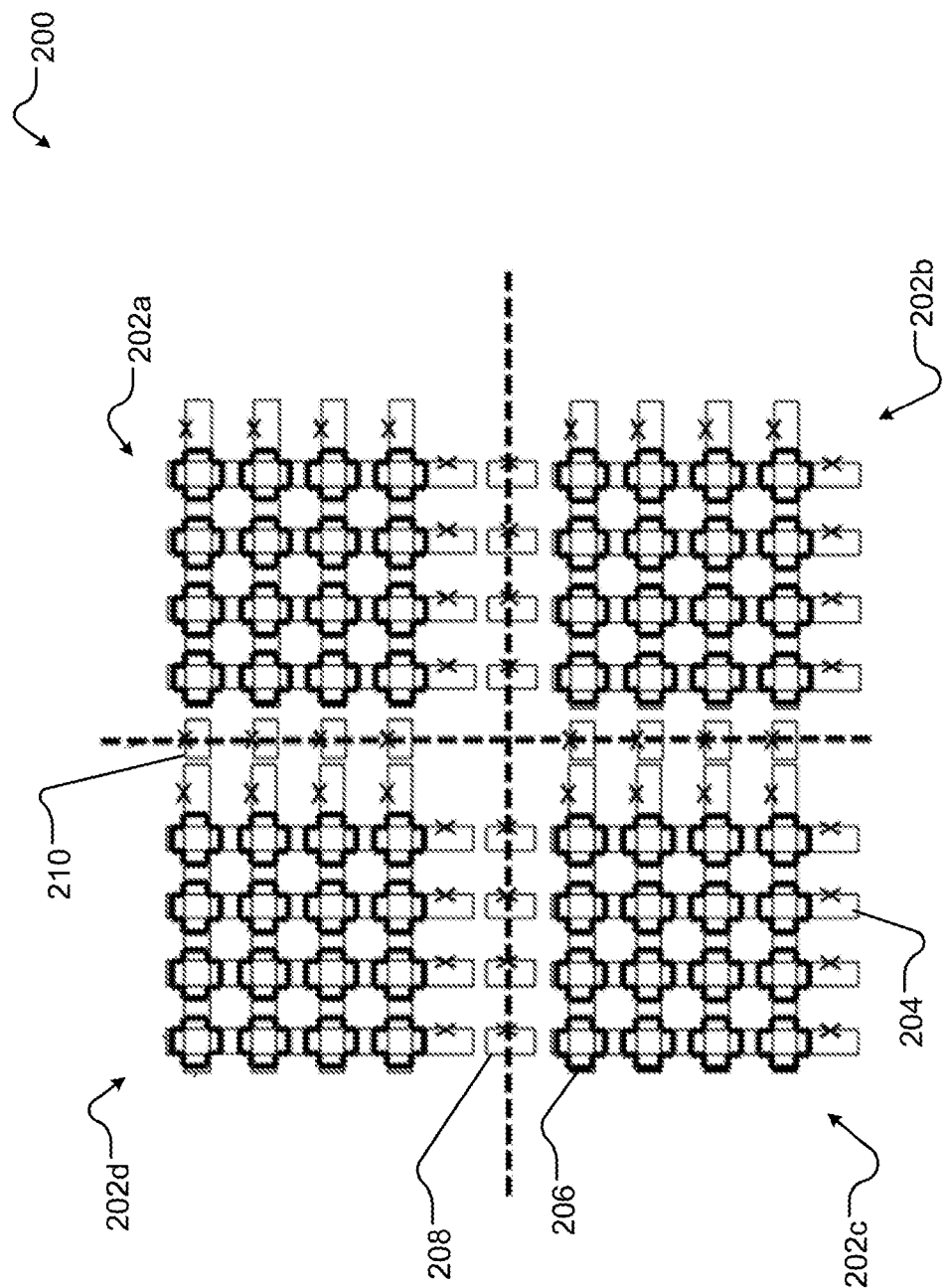
FIG. 2 is a schematic diagram that illustrates a portion of an exemplary topology, suitable for implementing the analog computer of FIG. 1, for example via quantum annealing in accordance with the present systems, devices, articles, and methods.

FIG. 2 shows an exemplary topology 200 for a quantum processor, in accordance with the presently described systems, devices, articles, and methods. Topology 200 may be used to implement quantum processor 124 of FIG. 1, however other topologies can also be used for the systems and methods of the present disclosure. Topology 200 comprises a grid of 2×2 cells such as cells 202a, 202b, 202c and 202d (collectively 202), each cell comprised of 8 qubits such as qubit 204 (only one called out in FIG. 2).

Within each cell 202, there are eight qubits 204, the qubits 204 in each cell 202 arranged four rows (extending horizontally in drawing sheet) and four columns (extending vertically in drawing sheet). Pairs of qubits 204 from the rows and columns can be communicatively coupled to one another by a respective coupler such as coupler 206 (illustrated by bold cross shapes, only one called out in FIG. 2). A respective coupler 206 is positioned and operable to communicatively couple the qubit in each column (vertically-oriented qubit in drawing sheet) in each cell to the qubits in each row (horizontally-oriented qubit in drawing sheet) in the same cell. Additionally, a respective coupler, such as coupler 208 (only one called out in FIG. 2), is positioned and operable to communicatively couple the qubit in each column (vertically-oriented qubit in drawing sheet) in each cell with a corresponding qubit in each column (vertically-oriented qubit in drawing sheet) in a nearest neighboring cell in a same direction as the orientation of the columns. Similarly, a respective coupler, such as coupler 210 (only one called out in FIG. 2), is positioned and operable to communicatively couple the qubit in each row (horizontally-oriented qubit in drawing sheet) in each cell with a corresponding qubit in each row (horizontally-oriented qubit in drawing sheet) in each nearest neighboring cell in a same direction as the orientation of the rows. While couplers 206 are illustrated by bold cross shapes, such is not intended to be limiting, and couplers 206 can have any of a variety of other shapes.

Figure 3A:
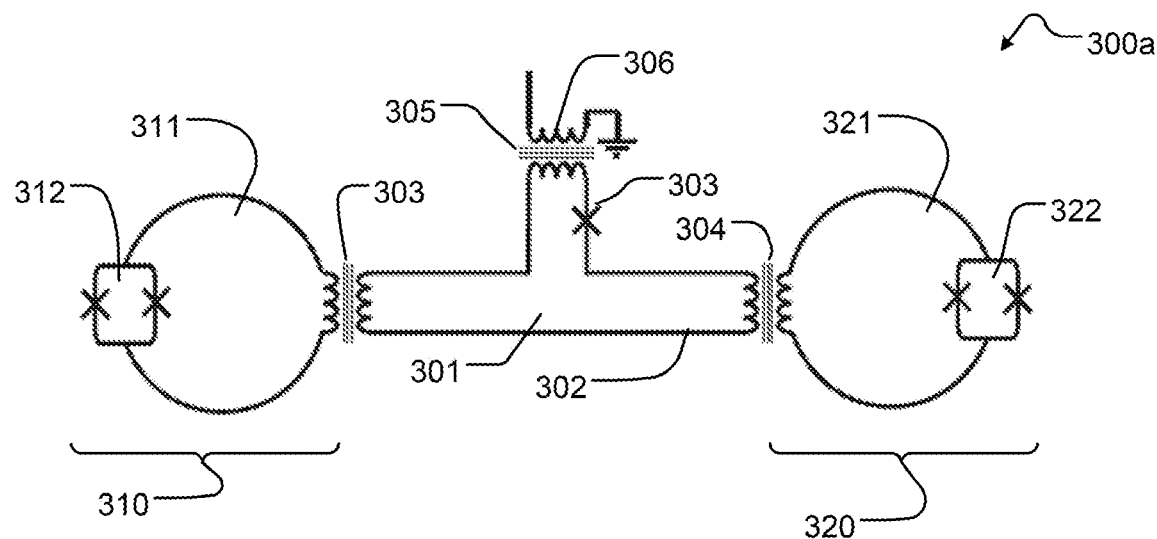
FIG. 3A shows a schematic diagram of a controllable ZZ-coupler, suitable for implementing the topology of FIG. 2.

FIG. 3A shows a schematic diagram of an exemplary implementation of a system 300a comprising a controllable ZZ-coupler 301. Controllable ZZ-coupler 301 includes a loop of superconducting material 302 interrupted by a Josephson junction 303 and is used to couple a first qubit 310 and a second qubit 320. First qubit 310 is comprised of a loop of superconducting material (or "qubit loop") 311 interrupted by a compound Josephson junction ("CJJ") 312 and is coupled to controllable ZZ-coupler 301 through the exchange of flux 303 between controllable ZZ-coupler 301 and first qubit 310. Second qubit 320 is comprised of a loop of superconducting material (or "qubit loop") 321 interrupted by a CJJ 322 and is coupled to controllable ZZ-coupler 301 through the exchange of flux 304 between controllable ZZ-coupler 301 and second qubit 320. Loop of superconducting material 302 is threaded by flux 305 created by electrical current flowing through a magnetic flux inductor 306. Controllable ZZ-coupler 301 may be used in in topology 200 to provide communicative coupling between qubits and thus be used in a quantum processor, in accordance with the presently described systems, devices, articles, and methods.

Variations and, for some applications, improvements to the ZZ-coupler design shown in FIG. 3A are presented in U.S. Pat. Nos. 7,898,282, and 7,800,395.

Figure 3B:
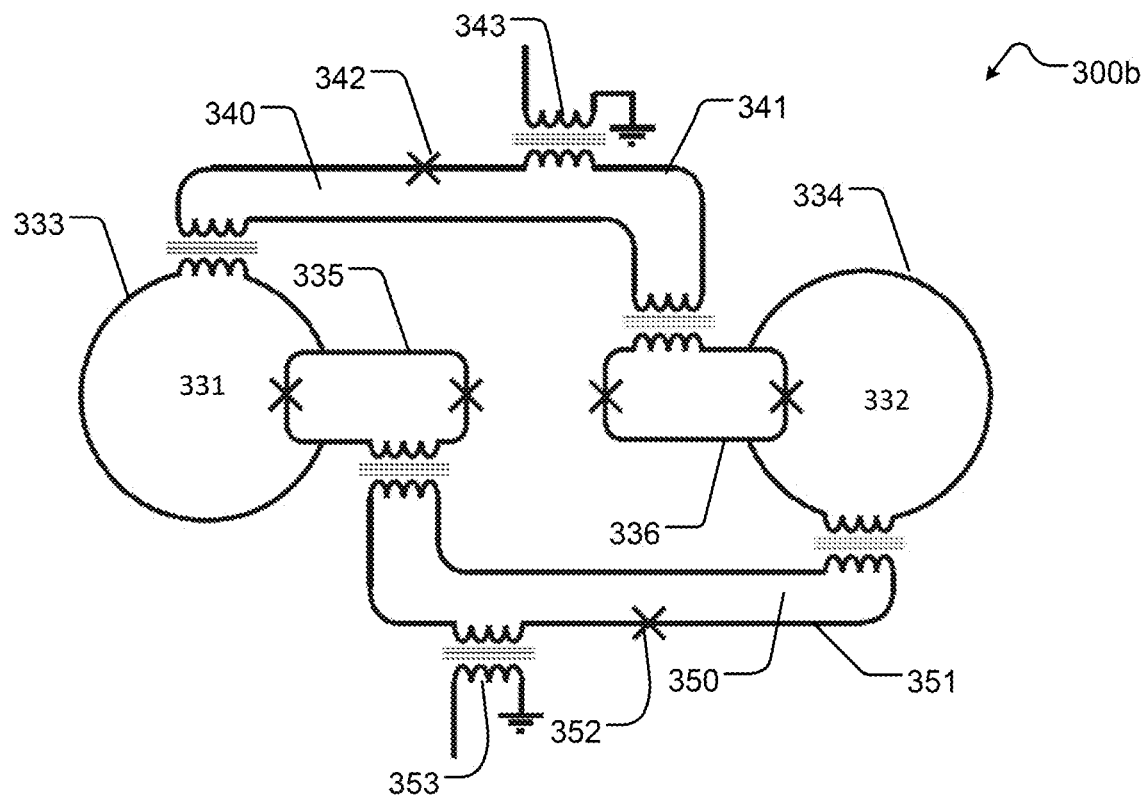
FIG. 3B is a schematic diagram of an embodiment of a system that includes two superconducting qubits and both a ZX-coupler and an XZ-coupler, each of which is operable to communicably couple information between the two qubits, suitable for implementing the topology of FIG. 2.

FIG. 3B is a schematic diagram of an exemplary implementation of a system 300b that includes two superconducting qubits 331, 332 and both a ZX-coupler 340 and an XZ-coupler 350, each of which is configured to communicably couple information between qubits 331 and 332. Each of qubits 331 and 332 includes a qubit loop 333, 334, respectively, formed by a closed superconducting current path that is interrupted by a CJJ 335, 336, respectively.

ZX-coupler 340 includes a closed superconducting current path 341 that is inductively coupled to both the qubit loop 333 of qubit 331 and the CJJ 336 of qubit 332. Thus, ZX-coupler 340 provides coupling between the Z-degree of freedom in qubit 331 and the X-degree of freedom in qubit 332 by inductively coupling the persistent current in the qubit loop 333 of qubit 331 into the CJJ 336 of qubit 332.

In the case of ZX-coupler 340, tunability is realized by two tuning elements: closed superconducting current path 341 is interrupted by at least one Josephson junction 342 and closed superconducting current path 341 is inductively coupled to a programming interface 343.

Similarly, XZ-coupler 350 includes a closed superconducting current path 351 that is inductively coupled to both the qubit loop 334 of qubit 332 and the CJJ 335 of qubit 331. Thus, XZ-coupler 350 provides coupling between the X-degree of freedom in qubit 331 and the Z-degree of freedom in qubit 332 by inductively coupling the persistent current in the qubit loop 334 of qubit 332 into the CJJ 335 of qubit 331.

Both XZ-coupler 350 and ZX-coupler 340 may also be made tunable by the combination of two tuning elements: closed superconducting current path 351 is interrupted by at least one Josephson junction 352 and inductively coupled to a programming interface 353, while closed superconducting current path 341 is interrupted by at least one Josephson Junction 342 and inductively coupled to a programming interface 343.

System 300b may be used in topology 200 to provide communicative coupling between qubits and thus be used in a quantum processor, in accordance with the presently described systems, devices, articles, and methods.

The present disclosure describes systems, methods and apparatus for performing machine learning by sampling from a sampling server.

Many machine learning algorithms depend on upon samples from computationally intractable distributions. An example of such an algorithm is gradient descent on the expected negative log-likelihood of a Restricted Boltzmann Machine (RBM). Other algorithms calculate the gradient descent on the expected negative log-likelihood to train deep Boltzmann machines or deep Boltzmann Machines networks. For all the above mentioned algorithms good samples may lead to successful learning.

However, sampling from RBMs and their progeny is #P-hard, and difficult to approximate in polynomial time. Heuristic approximations can be used in place of accurate samples. Algorithms such as contrastive divergence (CD) and persistent contrastive divergence (PCD) make use of heuristic approximations. CD and PCD are based on single Markov chains of single-temperature Gibbs sampling. CD and PCD may be run for a specified number of iterations to obtain samples with the desired accuracy. Other algorithms, such as simulated tempering and parallel tempering (including population annealing) use multiple temperatures. All of the methods may use multiple chains. Annealed importance sampling is another approach to approximation to evaluate expectations from computationally intractable distributions. A description of annealed importance sampling and applications using this method can be found in US Patent Application Publication No 2015-0269124. Annealed importance sampling obtains importance-weighted samples, but may suffer from large computation times on problems for which good proposal distributions are unknown. There is thus a general desire for systems and methods that produce better samples from computationally intractable distributions.

Algorithms such as CD and PCD integrate the sampling operation into the machine learning algorithm, seeding the Markov chains either from the approximation to the posterior distribution over the latent variables given the training data or from the end of the last set of Markov chains. Applicant believe that in all these algorithms, the sampling operation is performed on the same machine as the main machine learning algorithm. In addition, the sampling operation is generally implemented so as not to consume orders of magnitude more processing power than other components of the machine learning algorithm. However, obtaining accurate samples is resource intensive and can take exponentially more time to produce than other computations of the machine learning algorithm (e.g., calculating the gradient of the expected negative log-likelihood).

In response to the difficulty of obtaining accurate samples from computationally intractable distribution, modern generative learning algorithms are based on directed graphical models and use prior distributions for which sampling is computationally tractable by construction. An example of such a generative learning algorithms is variational auto encoders.

Given the difficulty in obtaining accurate samples from computationally intractable distribution, the performance of machine learning algorithms is limited by the computational time and resources needed to produce samples.

The following systems, methods and apparatus describe an approach which may significantly improve the performance of machine learning algorithms, and hence machine learning systems, by detaching the sampling operations from the other computations of the machine learning algorithms.

The distributions from which machine learning algorithms require samples change slowly over the course of the training. As a result, samples from a distribution at iteration n are a good approximation to samples from the distribution at iteration n+1. Therefore, work done on previous iterations can be used to bootstrap sampling from the current iteration. PCD also leverages this phenomenon.

In order to do as much work as possible during iteration n in preparation for iteration n+1, the sampling operation may be offloaded onto a distinct server. A distinct server, or sampling server, may do the sampling work in the background, while the machine learning algorithm performs other operations, for example calculates the gradient descent. The sampling server can devote all its resources to increase the quality of the samples without impacting the running time of the machine learning algorithm. The sampling server may run on a cluster of machines, in which case the sampling work can be parallelized over the number of machines in the cluster of machines.

In one implementation, the sampling server receives a stream of slowly changing parameters (h, j) of a Boltzmann distribution from a machine learning algorithm and returns functions of the samples from the current distribution. An example of functions of the samples are first- and second-order statistics (i.e., average spin and spin-spin correlations). The machine learning algorithm can then maximize the log-likelihood of a generative model based on a Boltzmann machine.

Upon receiving parameters (h, j), the sampling server uses parameter (h, j) to construct an RBM from which to generate samples using Gibbs sampling, parallel tempering, population annealing or other algorithms, with chains seeded from the last call to the sampling server. As long as the parameters (h, j) change slowly between calls to the sampling server, the seed can produce useful samples. A successive call to the sampling server is accompanied by the most recent set of parameters (h', j'), so that the sampling server constructs a new RBM based on the received parameters (h', j') each time it is called.

In addition to the samples and the statistics, the sampling server may return to the machine learning algorithm other metrics. An examples of metrics that can be calculated by the sampling server are: an approximation to the log-partition function, the auto correlation time of the current distribution, other measures of sampling difficulty. These additional metrics may be requested and returned infrequently, e.g., once every 3000 requests for samples.

In the case of a Boltzmann distribution, the distribution may be Chimera-structured, full-bipartite or fully connected. In certain cases, e.g. graph of low tree-width, specialized algorithms may be used.

The sampling server may run on the sample GPU or CPU as the machine learning algorithm, in which case memory is shared between the sampling sever and the machine learning algorithm. In a different implementation, the sampling server may run the same machine as the machine learning algorithm but on a different GPU or CPU.

In alternative, the sampling server may run on a different machine than the machine learning algorithm and be in communication with the machine learning algorithm over a network. In the latter case, the request for samples and the transfer of parameters and samples happens over the network. The sampling server may be spread over a cluster of machines over a network.

If the sampling server is not on the same GPU or CPU as the machine learning algorithm, the sampling server may use the available time between requests for samples to improve the quality of the samples under the current set of parameters. These high quality samples may be used by the sampling server to seed sampling when the machine learning algorithm requests samples with a new, slightly different, set of parameters.

The sampling server may be used with variational auto encoders to produce samples from the Boltzmann machine in its prior. The use of a sampling server would facilitate the use of fully-connected Boltzmann machines, from which it is difficult to samples efficiently using conventional methods, such as TensorFlow, given that the sampling operation can be parallelized over multiple units in the Boltzmann machine. A description of a variational auto encoder can be found in International Patent Application No PCT/US2016/047627.

Figure 4:
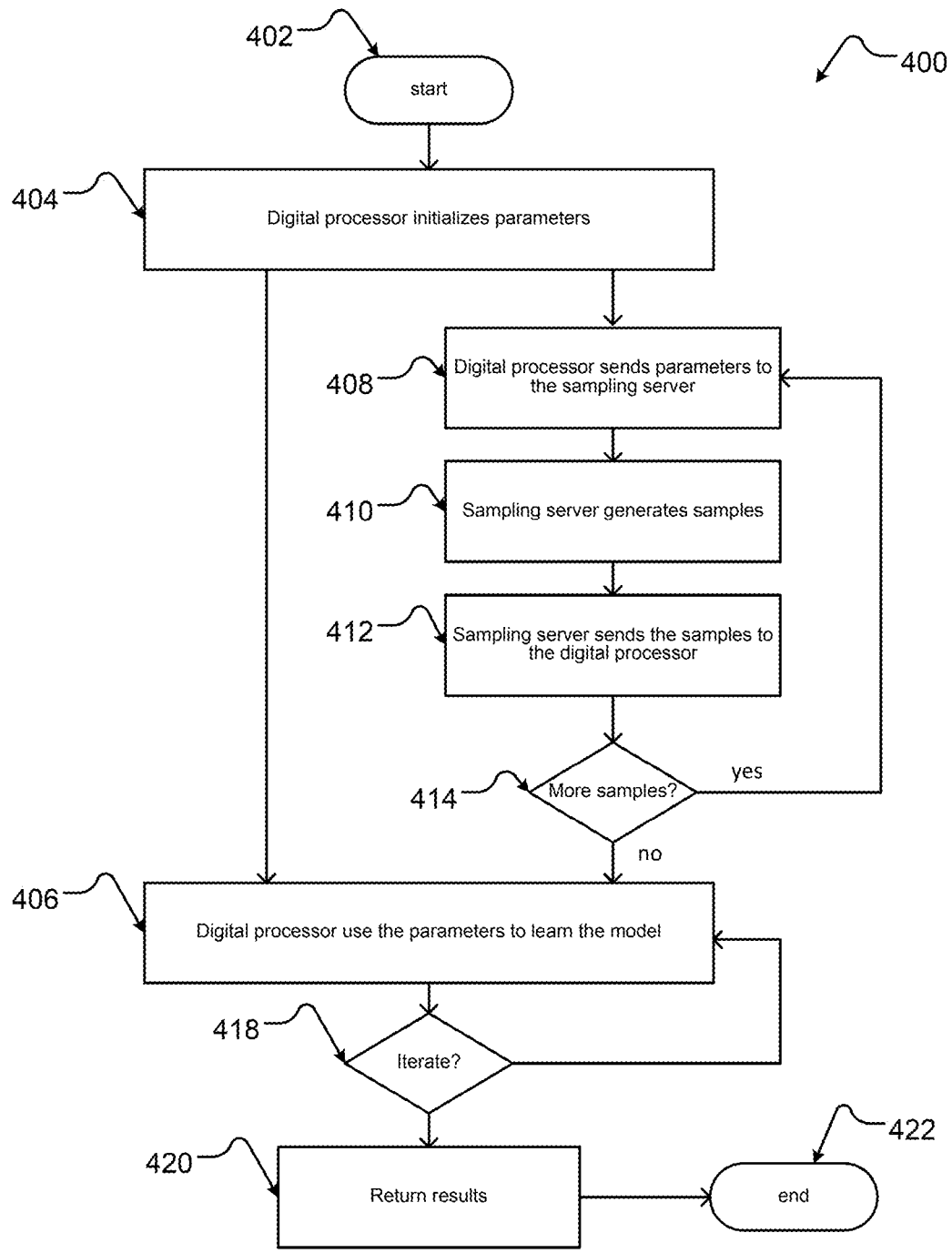
FIG. 4 is a flow diagram that shows a method for performing machine learning by sampling from a sampling server in accordance with the present systems, devices, articles, and methods.

FIG. 4 shows a method 400 for performing machine learning by drawing samples from a sampling server in accordance with the present systems, devices, articles, and methods. Execution of the method 400 by one or more processor-based devices may occur in accordance with the present system, devices, articles, and methods. Method 400, like other methods herein, may be implemented by a series or set of processor-readable instructions executed by one or more processors (i.e., hardware circuitry). Method 400 may, for example, be executed on two or more cores of a single processor (e.g., graphics processor unit or GPU), each of the cores separate and distinct from the other processor cores. Method 400 may be executed on two or more cores of two or more processor units, each of the processor units separate and distinct from the other processor units. The method 400 may be executed on two or more cores of two or more processor units, which belong to two or more computers or machines, each computer or machine separate and distinct from the other computers or machines. The computers or machines may, for example, form one or more clusters, communicatively coupled by a network infrastructure, for instance a packet switch network with various packet switches and/or routers.

Method 400 starts at 402, for example in response to a call or invocation from another routine.

At 404, a first digital processor core or set of cores starts or start running a machine learning algorithm by initializing parameters of a distribution to be learned. An example of a distribution is the Boltzmann distribution with parameters (h, j).

Method 400 executes acts 406 and 408 in parallel or concurrently or even simultaneously.

At 406, the first digital processor core or set of cores that executes or execute the machine learning algorithm uses the parameters of the distribution to run a machine learning algorithm to learn said distribution with samples received from the sampling server. For example, the first digital processor core or set of cores may use the samples to calculate the gradient of the log-likelihood of a generative model based on a Boltzmann machine, with the aim of maximizing the log-likelihood of the generative model.

At 408, the first digital processor core or set of cores that executes or execute the machine learning algorithm sends a current set of parameters to the sampling server. At the first iteration, the first digital processor core or set of cores sends or send the parameters initialized at 404. At successive iterations, the first digital processor core or set of cores sends the sampling server a set of parameters from the most recent iteration of the machine learning algorithm running at 406.

At 410, a second digital processor core or set of cores that implements or implement the sampling server uses the parameters received at 408 to generate samples to be used in the machine learning algorithm running at 406. The sampling server can use the received parameters to construct an RBM from which to draw samples. The sampling server may use techniques such as Gibbs sampling, parallel tempering or other algorithms to draw samples.

At 412, the sampling server provides the samples to the first digital processor core or set of cores that executes or execute the machine learning algorithm. As previously noted, the first digital processor core or set of cores at 406 uses the samples for running the machine learning algorithm. Where the sampling server is implemented on a different machine from the machine learning, the samples are returned over a communications network, for example a packet switched network of packet switches and routers.

At 414, the first digital processor core or set of cores that executes or execute the machine learning algorithm determines whether more samples are needed. A decision to draw more samples may be based upon the completion of a number of iterations or based on a calculated performance factor. In the latter case, when a performance factor lacks improvement or starts to degrade is an indication to interrupt the sampling operation.

If a decision is made to draw more samples, control passes to 408 and the first digital processor core or set of cores that executes or execute the machine learning algorithm sends an updated set of parameters to the sampling server. Otherwise, control passes to 406 and the first digital processor core or set of cores runs the machine learning algorithm.

At 418, the first digital processor core or set of cores that executes or execute the machine learning algorithm tests to check whether stopping criterion has been met. A stopping criterion can be, for example, related to the number of iterations or measurement of a performance criterion between successive iterations. A performance criterion may be assessed, for example, via the difference between the output of an iteration of the machine learning algorithm and a training dataset. In the latter case, when a performance criterion starts to degrade or lack improvement between successive iteration is an indication that the machine learning algorithm should stop and control passes to 420. Otherwise control passes to 406 and the machine learning algorithm keeps running.

At 420, the first digital processor core or set of cores that executes or execute the machine learning algorithm returns the result of the machine learning algorithm.

At 422, method 400 terminates, for example until invoked again.

The sampling server may be used in conjunction with a quantum processor where the sampling server works as an interface between a machine learning algorithm and the quantum processor.

Figure 5A:
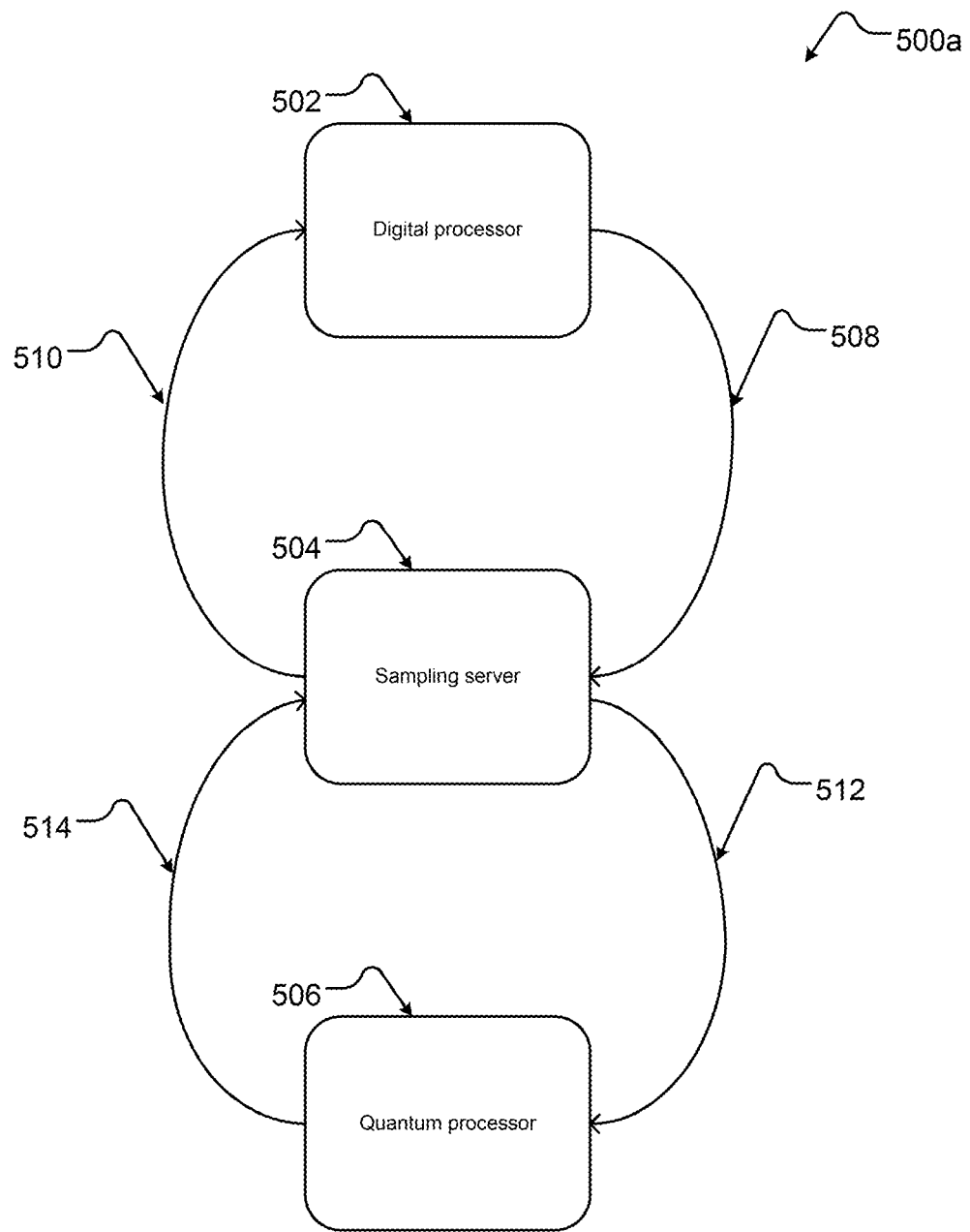
FIG. 5A is a schematic diagram that illustrates an exemplary hybrid system including a digital processor, a sampling server and a quantum processor and communications therebetween in accordance with the present systems, methods and apparatus.

FIG. 5A shows a hybrid system 500a comprising a digital processor core 502, a sampling server computer 504 and a quantum processor 506.

One or more processor cores 502 run the machine learning algorithm while sampling server computer 504 implemented by a different processor core or set of cores provides the samples as described above with reference to method 400 of FIG. 4. Sampling server computer 504 may be implemented on the same GPU or CPU as the machine learning algorithm, for instance on a separate core or separate set of cores. Alternatively, the sampling server computer 504 may be implemented on a separate GPU/CPU or separate set of GPUs/CPUs on the same machine or set of machines that executes or execute the machine learning algorithm. Additionally or alternatively, the sampling server computer 504 may be implemented on a separate machine or separate set of machines from a machine or set of machines that executes or execute the machine learning algorithm. The machine(s) that implements or implement the sampling server in communication with the digital processor(s) that execute the machine learning algorithm via one or more networks, for example packet switched networks. Quantum processor 506 may be a superconducting quantum processor and may be constructed with topology 200 of FIG. 2.

Methods for operating a quantum processor as a sample generator are described in U.S. Pat. No. 9,218,567 and US Patent Publication No US20160042294A1.

Sampling server 504 may request samples from quantum processor 506 and use such samples to reseed persistent Markov chains at the appropriate temperature. When requesting samples from quantum processor 506, sampling server 504 may perform parameter scaling before sending the parameters to quantum processor 506 to ensure that the distribution sampled by quantum processor 506 corresponds to the desired logical temperature. Sampling server 504 may select chain strengths and perform spin reversal transformation on the chains.

Sampling server 504 may request samples from quantum processor 506 at a slower rate than that at which parameters are received from and samples returned to the machine learning algorithm, or for every set of samples.

Sampling server 504 may ensure that the samples generated by the quantum processor are post-processed as needed before being sent to the machine learning algorithm. Sampling server 504 may use post processing techniques such as MCMC and importance sampling; however other post processing algorithms may also be used. Methods and techniques for post processing the output of a quantum processor can be found in U.S. Pat. Nos. 7,307,275, and 8,244,650.

In addition to reseeding the its Markov chains using the samples from quantum processor 506 that correspond directly to the desired distribution, sampling server 504 may use the samples provided by quantum processor 506 in a different way. For example, quantum processor 506 may be used to improve the quality of the samples in an indirect way. As an example, quantum processor 506 may be used to discover new valleys in the energy landscape of the distribution, therefore improving the quality of samples to be used by digital processor 502 to run a machine learning algorithm.

Digital processor 502 in hybrid system 500a sends a set of parameters (i.e., h, j of a Boltzmann distribution) to sampling server 504 (arrow 508 in FIG. 5A). Sampling server 504 may generate samples and send them to the digital processor (arrow 510 in FIG. 5A) or send the parameters (e.g., h, j) to quantum processor 506 (arrow 512 in FIG. 5A). Quantum processor 506 generates samples and sends them to sampling server 504 (arrow 514 in FIG. 5A). Upon receiving samples from quantum processor 506, sampling server 504 uses them samples to reseeds its Markov chains and sends updated samples to digital processor 502 (arrow 510 in FIG. 5A).

Figure 5B:
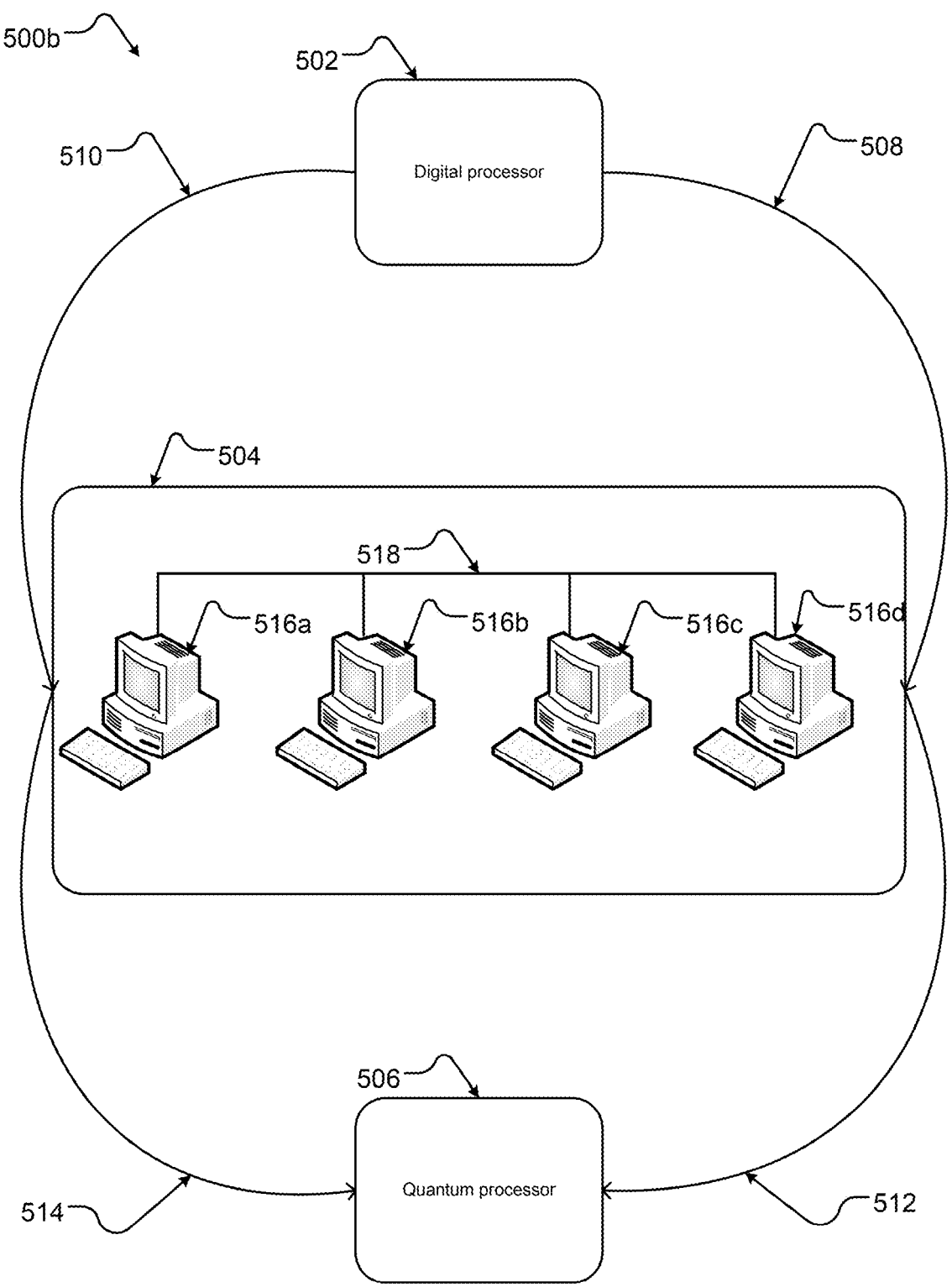
FIG. 5B is a schematic diagram that illustrates an exemplary hybrid system including a digital processor, a sampling server implemented as a cluster of processors and a quantum processor and communications therebetween in accordance with the present systems, methods and apparatus.

FIG. 5B shows a hybrid system 500b comprising a digital processor 502, a quantum processor 506 and a sampling server 504 implemented as a cluster of machines 516a-516d (collectively 516) in communicative coupling over a network 518. Network 518 may be implemented as a bus network, a ring network or other types of network structure. While in FIG. 5B sampling server 504 is illustrated as implemented as a cluster of four machines 516a-516d the number of machine is for illustration purposes only and cluster of machines 516 may have a smaller or larger number of distinct machines.

Digital processor 502 runs the machine learning algorithm while sampling server 504 provides the samples as described above with reference to method 400 of FIG. 4 and hybrid system 500a. Quantum processor 506 may be a superconducting quantum processor and may be constructed with topology 200 of FIG. 2.

Sampling server 504 may request samples from quantum processor 506 and use such samples to reseed persistent Markov chains at the appropriate temperature as described above with reference to hybrid system 5001.

Sampling server 504 may request samples from quantum processor 506 at a slower rate than a rate at which parameters are received from and samples returned to the machine learning algorithm, or for every set of samples.

Sampling server 504 may ensure that the samples generated by the quantum processor are post-processed as needed before being sent to the machine learning algorithm. In some implementations, the sampling server 504 employs the post-processed samples generated by the quantum processor to improve the generation of samples by the sampling server 504.

In addition to reseeding the its Markov chains using the samples from quantum processor 506 that correspond directly to the desired distribution, sampling server 504 may use the samples provided by quantum processor 506 in a different way. For example, quantum processor 506 may be used to improve the quality of the samples in an indirect way as described above with reference to hybrid system 500a.

Digital processor 502 in hybrid system 500b sends a set of parameters (i.e., h, j of a Boltzmann distribution) to sampling server 504 (arrow 508 in FIG. 5B). Sampling server 504 may generate samples and send them to the digital processor (arrow 510 in FIG. 5B) or send the parameters (e.g., h, j) to quantum processor 506 (arrow 512 in FIG. 5B). Quantum processor 506 generates samples and sends them to sampling server 504 (arrow 514 in FIG. 5B). Upon receiving samples from quantum processor 506, sampling server 504 uses them samples to reseeds its Markov chains and sends updated samples to digital processor 502 (arrow 510 in FIG. 5B).

Figure 6:
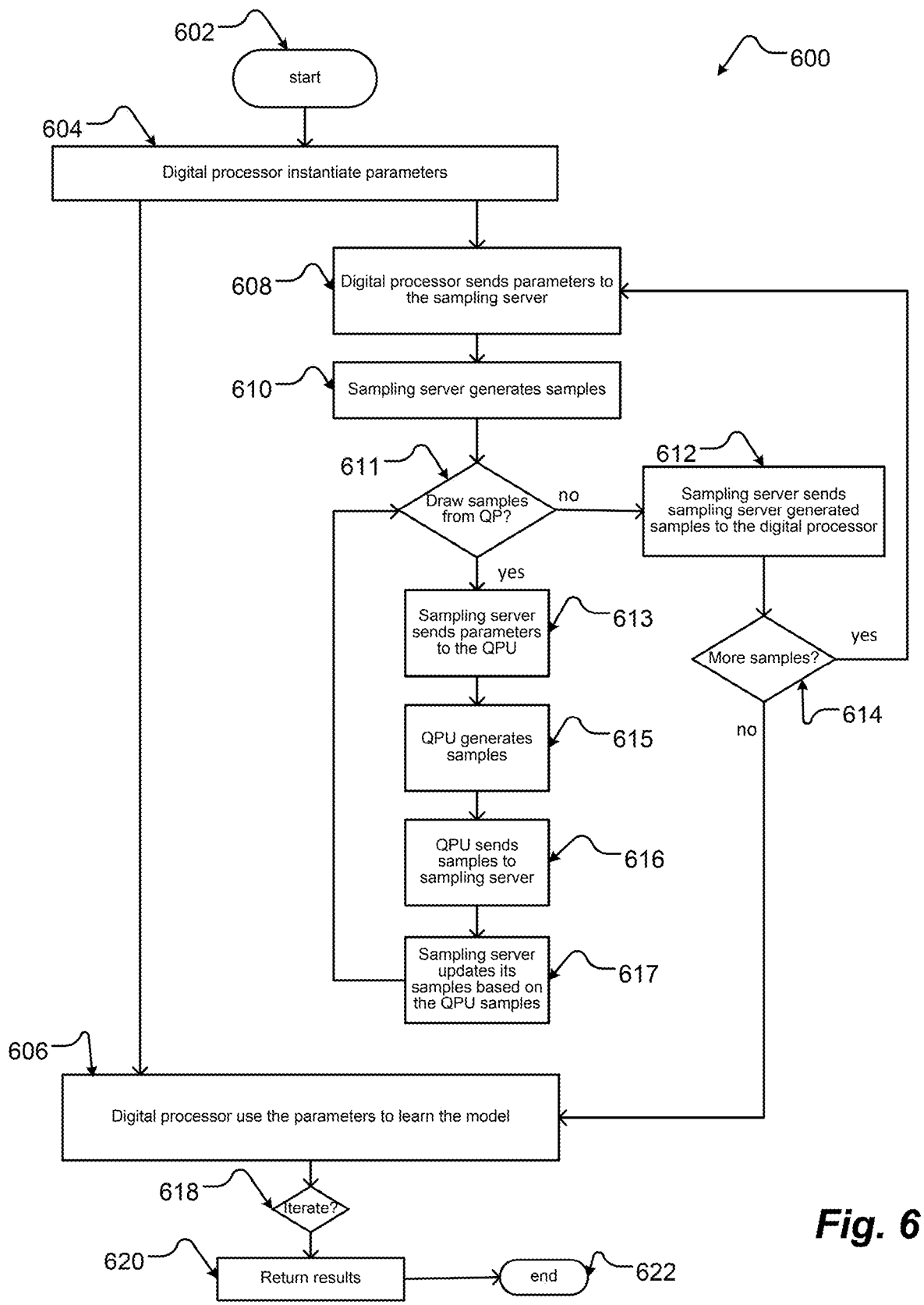
FIG. 6 is a flow diagram that shows a method for performing machine learning by sampling from a sampling server and a quantum processor.

FIG. 6 shows a method 600 for performing machine learning by drawing samples from a sampling server and a quantum processor. Method 600 may be implemented using hybrid system 500a or 500b. Execution of the method 600 by one or more processor-based devices may occur in accordance with the present system, devices, articles, and methods. Method 600, like other methods herein, may be implemented by a series or set of processor-readable instructions executed by one or more processors (i.e., hardware circuitry). Method 600 may, for example, be executed on two or more cores of a single processor (e.g., graphics processor unit or GPU), each of the cores separate and distinct from the other processor cores. Method 600 may be executed on two or more cores of two or more processor units, each of the processor units separate and distinct from the other processor units. The method 600 may be executed on two or more cores of two or more processor units, which belong to two or more computers or machines, each computer or machine separate and distinct from the other computers or machines. The computers or machines may, for example, form one or more clusters, communicatively coupled by a network infrastructure, for instance a packet switch network with various packet switches and/or routers.

Method 600 starts at 602, for example in response to a call from another routine.

At 604, a first digital processor core or set of cores starts running a machine learning algorithm by initializing parameters of a distribution to be learned, as described with reference to 404 of method 400.

Method 600 executes acts 606 and 608 in parallel or concurrently or even simultaneously.

At 606, the first digital processor core or set of cores that executes or execute the machine learning algorithm uses the parameters of the distribution to run a machine learning algorithm to learn said distribution with samples received from the sampling server, as describe with reference to 406 of method 400.

At 608, the first digital processor core or set of cores that executes or execute the machine learning algorithm sends the current set of parameters to the sampling server, as described above with reference to 408 of method 400.

At 610, a second digital processor core or set of cores that implement the sampling server uses the parameters received at 608 to generate samples to be used in the machine learning algorithm running at 606, as described with reference to 410 of method 400.

At 611, the sampling server determines whether to request samples from the quantum processor. The sampling server may determine whether to request samples from the quantum processor based on a number of factors, including availability or scheduling ability of the quantum processor, recent requests for sample to the quantum processor or other factors. If the sampling server determines not to request samples from the quantum processor control passes to 612, otherwise to 613.

At 612, the sampling server returns the samples to the first digital processor core or set of cores that executes or execute the machine learning algorithm, as described with reference to 412 of method 400.

At 614, the first digital processor core or set of cores that executes or execute the machine learning algorithm determines or determine whether more samples are needed, as described with reference to 414 of method 400. If the first digital processor core or set of cores determines or determine that more samples are needed, control passes to 608, otherwise to 606.

At 613, the sampling server sends the most recent set of parameters to the quantum processor. The most recent set of parameters are the parameters last received from the digital processor. The sampling server may perform parameter scaling as described above before sending the parameters to the quantum processor.

At 615, the quantum processor uses the received set of parameters to construct a distribution corresponding to the parameters and draw samples from said distribution.

At 616, the quantum processor sends the samples to the sampling server. The transmission of the samples may happen over a network.

At 617, the sampling server may perform post-processing on the received samples from the quantum processor before using the samples to reseed it Markov chains, thus producing updated samples based on the results from the quantum processor. Control then passes to 611.

At 618, method 600 tests to check whether stopping criterion has been met, as described with reference to 428 of method 400.

At 620, the first digital processor or set of cores that executes or execute the machine learning algorithm returns or return the result of the machine learning algorithm.

At 622, method 600 terminates until invoked again. Alternatively, the method 600 may automatically repeat.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. To the extent that they are not inconsistent with the specific teachings and definitions herein, all of the US patent application publications, US patent applications, US patents, International patent applications, foreign patents, and foreign patent applications referred to in this specification and/or listed in the Application Data Sheet that are commonly owned by D-Wave Systems Inc. are incorporated herein by reference, in their entirety, including but not limited to: U.S. Pat. Nos. 7,898,282; 7,800,395; 8,670,807; U.S. patent application Ser. No. 14/676,605; International Patent Application No. PCT/US2016/047627; U.S. Pat. No. 9,218,567; US Patent Publication No. US20160042294A1; and U.S. provisional patent application Ser. No. 62/399,764, file Sep. 26, 2016 and entitled "Systems and Methods for Degeneracy Mitigation in a Quantum Processor" and U.S. provisional patent application Ser. No. 62/399,683, file Sep. 26, 2016 and entitled "Systems, Methods and Apparatus for Sampling from a Sampling Server".

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A computational system for use in machine learning, the computational system comprising:
   at least one digital processor core; and
   at least one nontransitory processor-readable medium communicatively coupleable to the at least one digital processor core and that stores at least one of processor-executable instructions or data which, when executed by the at least one digital processor core, causes the at least one digital processor core to implement a sampling server that:
   receives an initial set of parameters for an iteration of a machine learning process that is executing in parallel with the sampling server on a separate at least one digital processor core from the at least one digital processor core on which the sampling server is implemented;
   generates a first set of samples based on the initial set of parameters temporarily in parallel with execution of the machine learning process; and
   provide the first set of samples generated by sampling server as implemented by the at least one digital processor core for use in a further iteration of the machine learning process,
   wherein the at least one digital processor core on which the sampling server is implemented is further communicatively coupleable to at least one quantum processor, and execution of the processor-executable instructions or data cause the at least one digital processor core on which the sampling server is implemented further to:
   provide a current set of parameters from the sampling server to the at least one quantum processor; and
   receive a set of quantum processor generated samples from the at least one quantum processor, wherein the quantum processor draws samples from a distribution based at least in part on the current set of parameters provided by the sampling server.

2. The computational system of claim 1 wherein execution of the processor-executable instructions or data cause the at least one digital processor core to provide a first set of functions along with the first set of samples generated by sampling server, wherein the first set of functions include are first- and second-order statistics; and causes the sampling server to send samples, functions of samples and an approximation to a log partition function to the at least one separate digital processor core on which the machine learning process executes.

3. The computational system of claim 1 wherein execution of the processor-executable instructions or data cause the at least one digital processor core to draw samples via at least one of Markov Chain of single temperature Gibbs sampling, simulated tempering, parallel tempering, population annealing, annealed importance sampling, and from a Boltzmann distribution.

4. The computational system of claim 1 wherein the machine learning process maximizes a log-likelihood of a generative model.

5. The computational system of claim 1 wherein execution of the processor-executable instructions or data cause the at least one digital processor core on which the sampling server is implemented further to:
perform post processing on the samples received from the quantum processor.

6. The computational system of claim 1 wherein the quantum processor performs chain embedding before drawing samples.

7. The computational system of claim 1 wherein the at least one digital processor core on which the sampling server is implemented is a first processor core of a graphical processor unit with a memory space, the separate at least one digital processor core that executes the machine learning process is a second processor core of the graphical processor unit and shares the memory space with the first processor core of the graphical processor unit.

8. The computational system of claim 1 wherein the at least one digital processor core on which the sampling server is implemented is a processor core of a first graphical processor unit and the separate at least one digital processor core that executes the machine learning process is a processor core of a second graphical processor unit, the second graphical processor unit separate and distinct from the first graphical processor unit.

9. The computational system of claim 8 wherein the at least one digital processor core on which the sampling server is implemented includes a plurality of digital processor cores of a plurality of processors that are separate and distinct from one another, and the plurality of processors are components of a plurality of computers, the computers which from a cluster of machines communicatively coupled via a network infrastructure.

10. The computational system of claim 1 wherein execution of the processor-executable instructions or data cause the at least one digital processor core further to:
iteratively receive additional sets of parameters for each of a number of iterations of the machine learning process that is executing in parallel with the sampling server on the separate at least one digital processor core from the at least one digital processor core on which the sampling server is implemented;
iteratively generate an additional set of samples based on respective ones of the additional sets of parameters temporarily in parallel with execution of the machine learning process; and
iteratively provide the additional sets of samples generated by sampling server as implemented by the at least one digital processor core for use in the iterations of the machine learning process.

11. The computational system of claim 1 wherein the sampling server executes concurrently with the machine learning process, overlapping at least a portion thereof.

12. A method of operation of a computational system for use in machine learning, the method comprising:
receiving, by at least one digital processor core that implements a sampling server, an initial set of parameters for an iteration of a machine learning process that is executing in parallel with the sampling server on a separate at least one digital processor core from the at least one digital processor core on which the sampling server is implemented;
generating, by at least one digital processor core that implements a sampling server, a first set of samples based on the initial set of parameters temporarily in parallel with execution of the machine learning process;
providing, by at least one digital processor core that implements a sampling server, the first set of samples generated by sampling server as implemented by the at least one digital processor core for use in a further iteration of the machine learning process;
providing a current set of parameters from the sampling server to at least one quantum processor; and
receiving, by the sampling server, a second set of quantum processor generated samples from the at least one quantum processor based at least in part on the current set of parameters provided by the sampling server.

13. The method of claim 12, further comprising:
providing, by at least one digital processor core that implements a sampling server, a first set of functions along with the first set of samples generated by sampling server, wherein the first set of functions include are first- and second-order statistics; and
sending functions of samples and an approximation to a log partition function by the sampling server to the at least one separate digital processor core on which the machine learning process executes.

14. The method of claim 12, further comprising:
drawing samples via at least one of Markov Chain of single temperature Gibbs sampling, simulated tempering, parallel tempering, population annealing, annealed importance sampling, and from a Boltzmann distribution by the separate at least one digital processor core that executes the machine learning process.

15. The method of claim 12, further comprising:
performing post processing, by the sampling server, on the second set of samples before updating the current set of samples to produce a third set of samples based at least in part on the second set of samples.

16. The method of claim 12, further comprising:
performing a chain embedding, by the quantum processor, before drawing samples by the quantum processor.

17. The method of claim 12, further comprising:
iteratively receiving additional sets of parameters for each of a number of iterations of the machine learning process that is executing in parallel with the sampling server on the separate at least one digital processor core from the at least one digital processor core on which the sampling server is implemented;
iteratively generating an additional sets of samples based on respective ones of the additional sets of parameters temporarily in parallel with execution of the machine learning process; and
iteratively providing the additional sets of samples generated by sampling server as implemented by the at least one digital processor core for use in the iterations of the machine learning process.

18. The method of claim 12 wherein the sampling server executes concurrently with the machine learning process, overlapping at least a portion thereof.

\* \* \* \* \*